United States Patent [19]

O'Brien

[11] 4,271,430

[45] Jun. 2, 1981

[54] MICROFILM DISPLAY APPARATUS

[75] Inventor: Gerald E. O'Brien, Atlanta, Ga.

[73] Assignee: Computer Microfilm International Corporation, Atlanta, Ga.

[21] Appl. No.: 895,153

[22] Filed: Apr. 10, 1978

[51] Int. Cl.³ .............................................. H04N 5/22
[52] U.S. Cl. .................... 358/102; 307/259; 358/181
[58] Field of Search ................ 358/102, 181, 183, 22, 358/108, 903, 93; 307/259; 328/154

[56] References Cited

U.S. PATENT DOCUMENTS

| 2,697,746 | 12/1954 | Kennedy | 358/181 |
|---|---|---|---|
| 3,047,741 | 7/1962 | Snow | 307/259 |
| 3,117,183 | 1/1964 | Mullin | 358/214 |
| 3,315,034 | 4/1967 | White | 358/219 |
| 3,539,715 | 11/1970 | Lemelson | 358/102 |
| 3,612,762 | 10/1971 | Wuellner et al. | 358/219 |
| 3,702,898 | 11/1972 | Webb | 358/181 |
| 3,803,350 | 4/1974 | Lemelson | 358/903 |
| 4,021,841 | 5/1977 | Weinger | 358/183 |

FOREIGN PATENT DOCUMENTS 2337907  8/1977  France ..................................... 358/102

OTHER PUBLICATIONS

Powell, Automated Video Monitoring System, IBM Tech. Discl. Bull., vol. 18, #7, pp. 2280-2281, Dec. 1975.

Bush et al., Display of Stored Images, IBM Tech. Discl. Bull., vol. 18, #1, pp. 272-273, Jun. 1975.

*Primary Examiner*—Joseph A. Orsino, Jr.
*Attorney, Agent, or Firm*—Brumbaugh, Graves, Donohue & Raymond

[57] ABSTRACT

A microfilm display device is responsive to a film address signal and controlled by a microprocessor to locate a desired film and select a film image for display on a cathode-ray terminal. The film image is converted to a video signal for display on the terminal. The video signal is used for fine positioning of the raster on a flying spot scanner which illuminates the film.

2 Claims, 21 Drawing Figures

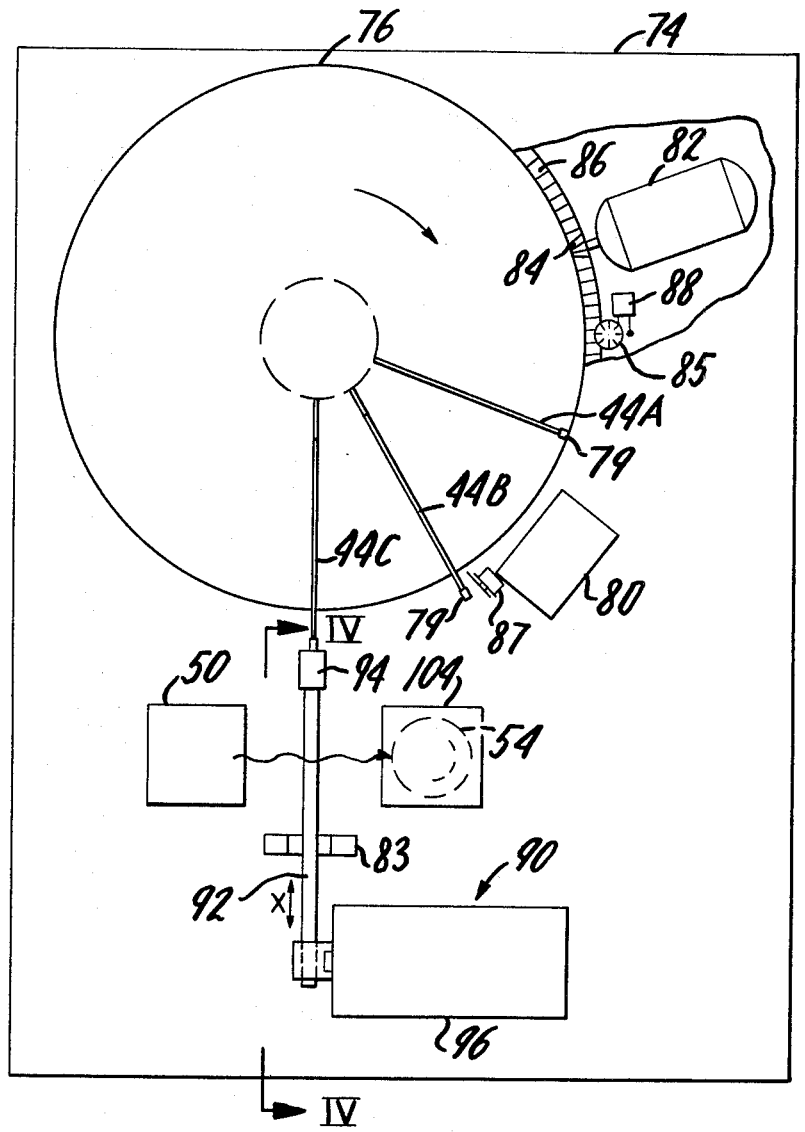
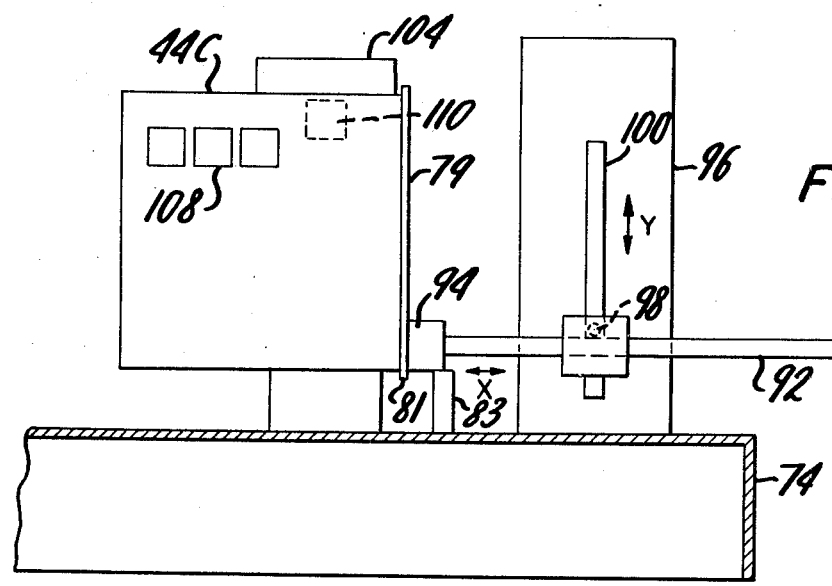

MICROFILM DISPLAY APPARATUS

BACKGROUND OF THE INVENTION

This invention relates to apparatus for displaying information stored on film, and particularly to apparatus wherein an image on film is converted into a video signal for display on a video terminal.

Prior U.S. Pat. No. 3,753,240 discloses an apparatus useful for displaying images contained on film. The apparatus includes mechanical means for selecting a particular film, such as a micorfiche card, locating that film in the operative position of a video signal generator, so that the image on the film can be converted into a television-type video signal, and the video signal provided to a display for display of the information contained on the film. This type of system is particularly useful for retrieving information which is not easily reduced to alpha-numeric format. For example, a great deal of alpha-numeric data storage would be required to store the equivalent of individual's signature in conventional computer data storage equipment. This type of storage would require that the signature be encoded according to a code representing each segment of the signature, and its relative position with respect to the other segments of the signature. A large storage capacity woudl be required to permanently record this information in a computer system and make it available for relatively rapid display on a terminal in response to instructions by the operator of the computer.

Systems for storing information, such as photographs or signatures, on microfilm have been known for years, and provide a relatively economical storage medium, since the information does not have to be reduced to digital format. Conventional microfilm storage systems require that the system user manually retrieve the individual film or microfiche card from a file, and place it in a viewer in order to located and display the individual image which he desires to view. Prior U.S. Pat. No. 3,753,240 discloses a system wherein such image information is stored on microfiche cards, which can be automatically retrieved and positioned in the operative position of a video signal generator. The video signal generator then provides a television-type video signal representative of the microfiche image, and provides the signal for dispaly on a remote terminal.

This type of system is of particular advantage in applications wherein it is necessary to retrieve one of a large number of images from a file within a relatively short period of time. For example, when a customer presents a check for payment at a bank, it is desirable that the bank teller check the signature on the check against the signature of the banking customer which is on file. Typically, this requires that the teller leave his position, go to the central file, locate the card, compare the signature on the card with the signature on the check, return the card, and then return to his counter position to complete the transaction. In accordance with the prior patent, it is envisioned that a cathode-ray terminal at the teller's counter location can be provided, which will display a microfilm sorted image of the customers's signature in response to the teller's command, consisting of, for example, the customer's account number. Thus, much time and effort can be saved and the temptation to pay a check without verifying the signature is avoided.

The system disclosed in the prior patent has several disadvantages which make it difficult to implement the system in a practical environment. In particular, the prior system may experience difficulties in mechanical card retrieval. Also, it may not be able to adapt to microfilm images having different quality levels, because of photographic processing changes, and therefore different film density values for signature and background. Further, the prior art system makes no provision for handling microfilm images having different polarities. The prior system is adapted to provide only a single video image at any time. Therefore, in a bank with many tellers, it will be necessary for one teller to complete viewing a particular signature before another teller can have access to the system to view a different signature. While the prior system does provide for the possible provision of a marker image in each image frame to facilitate the alignment of raster scanning patterns with the frame, it is possible in accordance with the prior system that the frame image itself can interfere with the automatic operation of the electronics which locates the marker image and aligns the raster in accordance with the marker location. In addition, the prior system makes no provision for the possibility of there being multiple images on each frame of the micorfiche. In this case, it is desirable to change raster size in orde to provide a large dispaly of the desired individual image, by itself. It is also advantageous to blank portions of each frame which contain information other than that to be displayed. This avoids operator confusion. The prior system also makes no provision for rotation of the raster pattern of the image detecting system so that the raster pattern can be aligned with the actual orientation of the image on the film.

It is an object of the present invention to overcome these and other disadvantages of the prior system and to provide a complete and practical system for the rapid display of image information stored on microfilm or other film storage medium, in a system controlled by computer generated signals.

SUMMARY OF THE INVENTION

In accordance with the invention, there is provided apparatus usable in a video signal generating apparatus wherein an image is illuminated by a light source, and the light emitted by the image is sampled by a photosensitive detecting apparatus, responsive to a supplied voltage, to develop a first video signal representative of optical characteristics of the image. The apparatus is for varying the sensitivity of the detecting apparatus in accordance with the optical characteristics. The apparatus includes means responsive to the first video signal for develping a second video signal having a maximum signal value representative of the maximum light level incident on the detecting apparatus, and voltage control means responsive to the second video signal for varying the supplied voltage.

In a preferred embodiment, the image is a transparent image wherein optical signal characteristics comprise film transparency, and wherein the means for developing the second video signal comprises means for inverting the first video signal. The means for varying the supplied voltage may also include means for detecting the maximum value of the second video signal.

In accordance with the invention, there is also provided means in a video processing apparatus, responsive to a supplied polarity control signal, for selectively reversing the polarity of the video signal. The means includes an amplifier having first and second output terminals, for providing signals of opposite polarity. A first pair of oppositely facing diodes is connected in series between the first amplifier output terminal and a video output terminal. A second pair of oppositely facing diodes is similarly oriented as the first diodes and connected in series between said second amplifier output terminal and said video output terminal. There are provided means, responsive to a supplied polarity control signal, and connected to terminals between the diodes of the first and second diode pairs, for forward biasing the diodes of one of the pairs and reverse biasing the diodes of the other of the pairs in response to a first condition of the polarity control signal, and for reversing the biasing of the diodes in response to a second condition of the polarity control signal.

In accordance with the invention, there is also provided apparatus usable in a system for selecting and displaying film stored information, wherein desired film images are selected from a plurality of film images and converted into video signals for use in generating images on displays. The apparatus provides for simultaneous dispaly of multiple images on multiple displays, and includes at least one video memory, video switch means for selectively providing video signals to the video memory and the displays, and control means for controlling operation of the video switch means to cause a first image representative video signal to be recorded in said memory, and thereafter be supplied to a first selected display, and to cause a second image representative video signal to be supplied to a second selected display simultaneous with said supply of said first video signal.

The switch means may include a first video switch for controlling the supply of video signals to the video memory, and second video switches for controlling the supply of video signals to the display.

In accordance with the invention, there is provided apparatus usable in a film scanning apparatus having image detecting means, responsive to deflection signals supplied to horizontal and vertical deflection signal terminals, for detecting image characteristics on a film in a raster pattern, thereby to generate a video signal corresponding to the image characteristics. The apparatus is for controlling the angular orientation of the raster pattern in response to raster angle control signals, and icludes means for generating nominal horizontal and vertical raster deflection signals, and control means responsive to the raster angle control signals for supplying the horizontal and vertical deflection signals with selected amplitude and polarity to each of the horizontal and vertical deflection terminals.

In one embodiment, the vertical deflection signals are alternately supplied to either the vertical or horizontal deflection terminal and the horizontal deflection signals are alternately supplied to the horizontal and vertical deflection terminals, thereby to provide alternate raster patterns orthogonal to each other.

In another embodiment, the control means include means for combining the horizontal and vertical deflection signals with a first selected amplitude and polarity to form a first combined deflection signal, and for supplying the first combined signal to the vertical deflection terminal, and means for combining the horizontal and vertical deflection signals with a second selected amplitude and polarity to form second combined deflection signals and for supplying the second combined signals to the horizontal deflection terminal. Where the film includes a marker image, there may be provided means responsive to marker image representative portions of the video signal for generating marker image position signals, and data processing means, including a control program, for analyzing the marker image position signals, thereby to determine the angular orientation of the marker image with respect to the image detecting means, and the data processing means may thereby generate the raster angle control signals. The data processing means may also be programmed for analyzing the marker image position signals and determining the location of the marker image with respect to the image detecting means and for providing raster position signals, the raster position signals being used in means for changing the combined deflection signals to vary the position of the raster pattern with respect to the film. Where the film contains an image represntative of encoded data, the data can be arranged in a plurality of parallel tracks having predetermined location and angle with respect to the marker image and the raster pattern control apparatus can control the position and angle of the raster pattern to correspond to the data tracks.

For a better understanding of the present invention, together with other and further objects, reference is made to the following description, taken in conjunction with the accompanying drawings, and its scope will be pointed out in the appended claims.

BRIEF DESCRIPTION OF THE DRAWINGS

FIG. 3 is a top view of a mechanical film selecting apparatus in accordance with the invention.

FIG. 4 is a cross-sectional view of the FIG. 3 apparatus.

DESCRIPTION OF THE INVENTION

Figure 1:
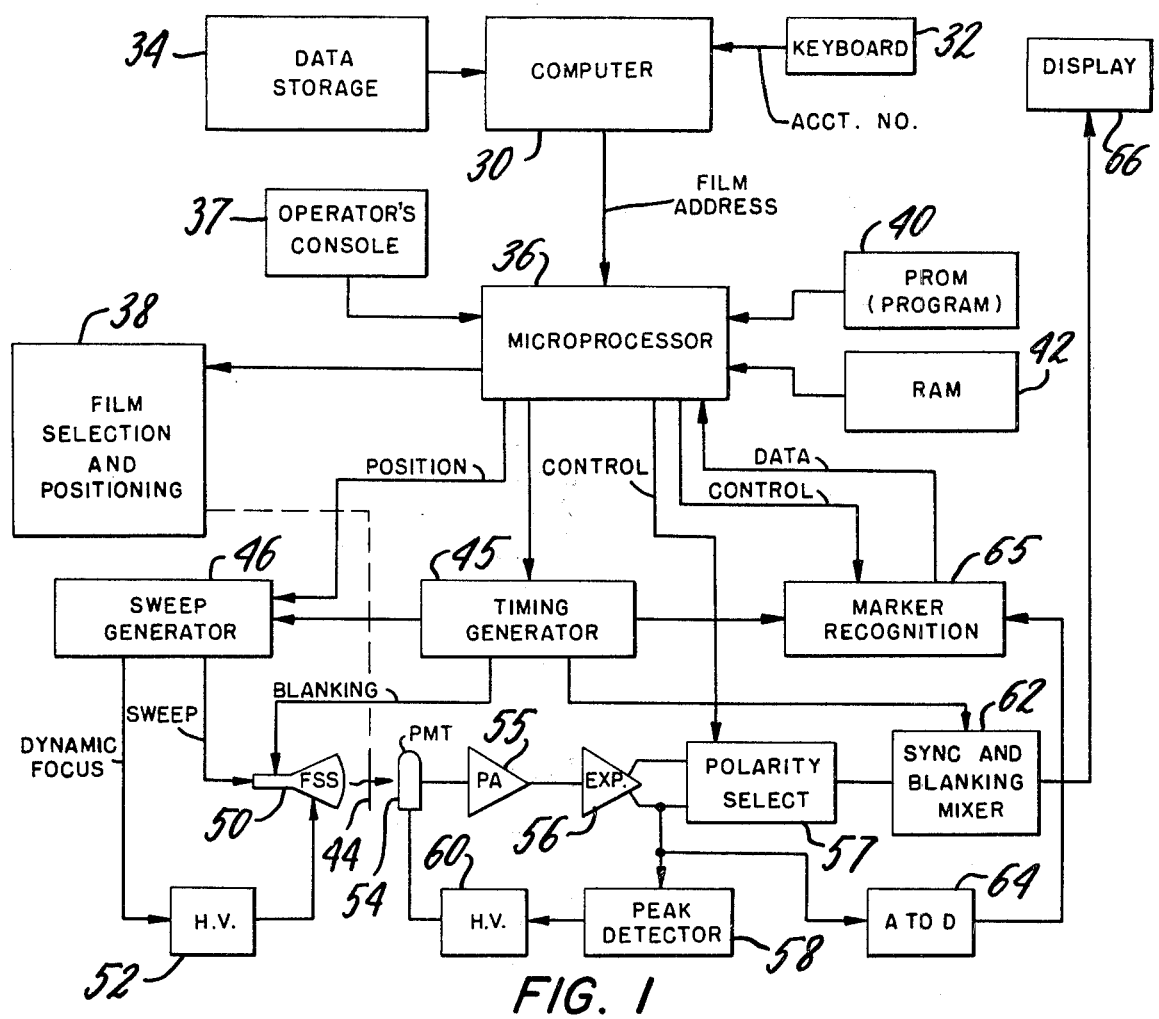
FIG. 1 is a block diagram illustrating a system in accordance with the present invention.

FIG. 1 is a block diagram showing an embodiment of the invention configured for use in a bank. As a typical embodiment, there is shown an arrangement wherein a microfilm display system is connected for use with the general purpose computer of a bank. The arragnement is configured to respond to the entry of a customer's account number on a keyboard 32, and produe a display of the customer's signature on a display unit 66. The encrypted account number is supplied from keyboard 32 to the bank's general purpose digital computer 30. The computer, by referency to the data memory 34, may supply the teller or operator with informatin concerning the customer's account, such as the account balance, and will also retrieve a microfilm address corresponding to the customer's signature. This film address is supplied to a microprocessor 36, which comprises the principle control element in the microfilm dispaly system.

In response to the film address supplied by computer 30, microprocessor 36 activates a mechanical film selection and positioning apparatus 38. The film selection and positioning apparatus 38 selects a microfilm unit, such as a microfiche card 44 and positions the appropriate frame of the microfilm in the operative position of a video signal generator, such as flying spot scanner 50 and photomultiplier tube 54. Microprocessor 36 performs all of its functions in accordance with a control program stored in programmable read only memory 40. A random access memory 42 is also provided for storage of ephemeral data while microprocessor 36 is performing the various functions required to display a particular signature on display 66.

Since a particular desired image may not be accurately located with respect to the mechanical dimensions of film 44, because of variations in the photographic processes by which the image is placed on the film, and since the intensity of the image on the film may also vary according to the film processing, the system shown in FIG. 1 has various devices for improving the location of the image with respect to the video detecting apparatus, and for improving image quality. In particular, there is provided a sweep generator 46 which generates raster deflection signals for flying spot scanner 50 under the control of microprocessor 36. A timing circuit 45 provides blanking of flying spot scanner 50 during return intervals of the raster deflection signals. The sweep generator 46 may also provide focus control signals to the high voltage power supply 52 in accordance with the location of the spot on the flying spot scanner. This function is commonly known as dynamic focus control. The output of photomultiplier tube 54 is provided to exponential amplifier 56, which removes the natural logarithmic function of the film image. A video processing circuit 57 converts the video signal from the photomultiplier tube to a positive or negative polarity in accordance with a control signal provided by microprocessor 36 and also provides inverted video signals to peak detector 58 which controls the voltage provided by high voltage power supply 60 to photomultiplier tube 54. The photomultiplier tube voltage is varied in accordance with the maximum peak video signal level in order to compensate for density variations in the film image.

Timing generator 45 provides horizontal and vertical deflection timing signals to sweep generator 46 and also provides synchronization and blanking signals to video output circuit 62. In accordance with these signals, the video signal is blanked during the sweep return intervals, and appropriate synchronization signals for operation of display 66 are combined to form a composite video signal. In addition, blanking signals may be provided to obliterate portions of the image of film 44 which are not required to be displayed on the display 66. For example, if the image being displayed is an individual signature, it is possible to provide blanking signals to eliminate the video signal portions corresponding to other signatures on the film.

In order to properly align the desired image from film 44 with the video detecting apparatus, there is provided a marker image on the film indicating the location on the film of the desired image. The video signal produced by the video signal generator is provided to an analog to digital conerter 64 which converts the analog video signal into a digital format. The digital signal is provided to marker recognition logic 65 which analyzes the signal and determines the location of the marker image with respect to the image detecting apparatus, consisting of flying spot scanner 50 and photomultiplier tube 54. The marker recognition logic provides marker position signals to microprocessor 36 which analyzes the position of the marker and calculates new postion signals which are provided to sweep generator 46, which modifies the vertical and horizontal deflection signals provided to flying spot scanner 50, and thereby relocates the raster pattern with respect to film 44 so that the desired portions of the image are scanned by the flying spot scanner and the appropriate video signal is generated. Control console 37 is provided for controlling operation of microprocessor 36 and displaying error messages generated by microporcessor 36.

Figure 2:
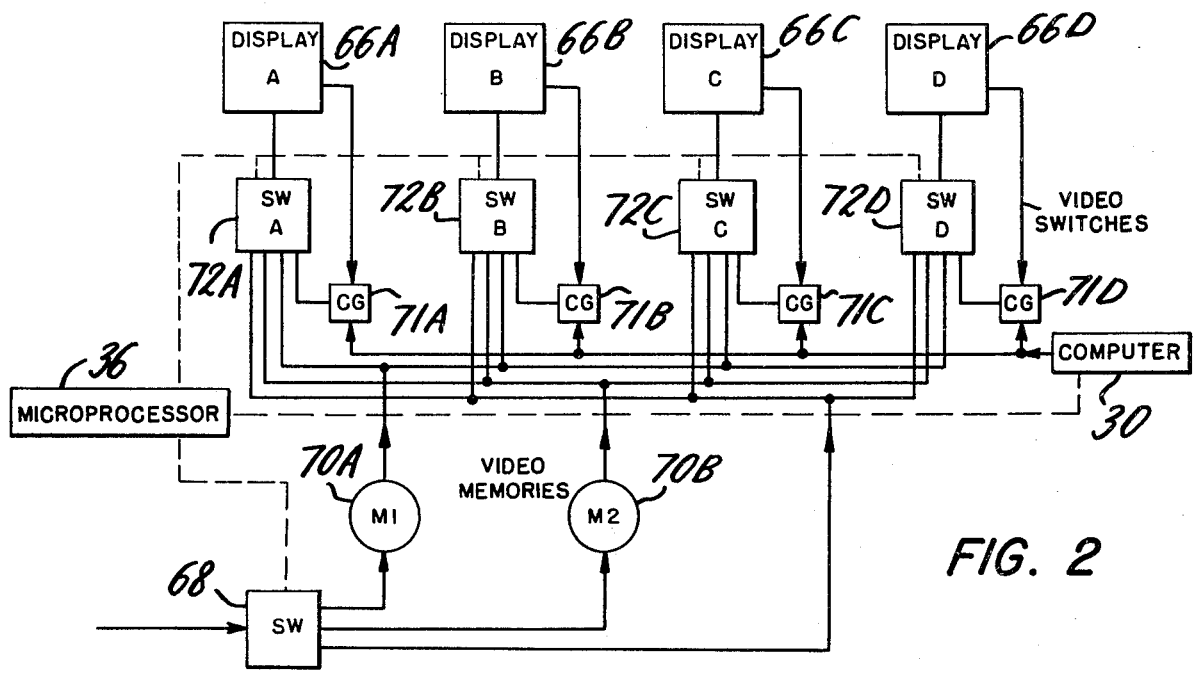
FIG. 2 is a block diagram illustrating a portion of the FIG. 1 system adapted for use with a plurality of displays.

FIG. 2 illustrates a variation of the FIG. 1 system wherein there are provided multiple display units 66A, 66B, 66C, and 66D. Each of these units may correspond to a teller's position in a bank. When one image is to be displayed on a particular display unit, for example display unit 66A, it may be desired that a different image be displayed on display unit 66B. This may occur in a banking system, for example, when a teller using display 66A wishes to view the microfilm image corresponding to a first customer's signature, and the teller using display unit 66B wishes to view another customer's signature. It also may be desired that a third teller wishes to view computer generated information on his display, such as the balance in a particular customer's account. In order to provide for a display of different images on the various displays, it is necessary to continuously provide video signals corresponding to the images to the displays. In order to accommodate this operation, each of the display units is provided with a corresponding video switch 72A, 72B, 72C, and 72D. Each of these switches may connect its corresponding display unit directly to switch 68, at the output of the video signal generating apparatus, or to one of video memories 70A or 70B. Alternately, switches 72 may connect their corresponding displays 66 to computer 30 through an appropriate character generator 71 to receive computer generated video signals, for example alpha-numeric data.

When one of the display units is to contain an image corresponding to a first image on a film, microporcessor 36 causes the film selection and positioning apparatus to locate that film in the operative position of the video detecting apparatus and generate a video signal corresponding to the image. Switch 68 connects the video signal generator to one of the video memories 70 and provides the video signal to the memory for an appropriate period, for example corresponding to one complete frame. The video signal is thereby stored in the video memory, for example memory 70A, and the video memory may be used to regenerate the video signal and provide the signal repeatedly to one of displays 66A, 66B, 66C, or 66D through the corresponding switch 72. While the video memory is continuously providing refreshed images on one of displays 66, another image may be selected by microprocessor 36 and its corresponding video signal stored in second video memory 70B for provision to another display 66. While memories 70A and 70B are providing images to two of the display units, it is possible to provide still a third video signal to another display unit directly from the video signal generator by switch 68 to the input of another display switch 72. In addition, it is possible to provide other information, for example, a video signal corresponding to alpha-numeric data from computer 30 to one of the displays through an appropriate character generator 71. By use of the video switch arrangement shown in FIG. 2, it is possible to provide simultaneous display of different images while only a single image is placed in the operative position of the video signal genertor at any particular time. The operation of the various switches and memories is under the control of the microprocessor 36, which determines which of the display units has called for a particular video signal, and sets the switches appropriately, using the video memories as an intermediate storage device as required.

FILM SELECTION AND POSITIONING

The film selection and positioning apparatus 38 shown as a block FIG. 1 is similar to the apparatus described in U.S. Pat. No. 3,429,436 to Irasek. In accordance with the Irasek disclosure, there is provided a rotating drum on which there are arranged many microfiche cards. The plane of each card is oriented parallel to the axis of the drum. In order to select a particular card, there is provided a film selecting apparatus which operates in conjunction with notches provided on clips on the edge of each card. The notches are coded so that each card has its own particular notch pattern and as the drum is rotated any individual card can be selected by the film selecting apparatus according to the pattern of its edge clip notches. The apparatus prevents the withdrawal of any film card whose edge clip does not correspond to the pattern set up in the selecting apparatus.

FIG. 3 is a top view of the film selecting apparatus 38. There is provided a chassis 74 upon which is mounted rotating drum 76. The drum is driven by a motor 82 which is connected by gear 84 to a gear 86 on the drum. The film selecting apparatus 80 is provided with signals corresponding to the card to be selected, and sets up a set of mechanical film selecting plates in accordance with the notches on the edge clip of the card to be selected. As the card 44A approaches the selecting apparatus 80, it is withdrawn from its position within the drum and caused to protrude to the position shown at 44B by magnetic forces. Only the card whose edge clip corresponds to the plate pattern set up in the selector 80 can be moved to the protruding position since the plates of selecting apparatus 80 prevent withdrawal of the remaining cards. A switch 87 is provided to detect the fact that the cards has been selected and partially withdrawn, and in accordance with the closing of the switch 87, the drum is caused to stop with the selected card in position 44C, wherein a mechanical arm 92 having a clip engaging member 94 engages the clip on card 44C and withdrawns the card from the drum in order to place it in an operative position with respect to the video detecting apparatus, comprising flying spot scanner 50 and photomultiplier tube 54. In accordance with the disclosure of Irasek, the timing of the stopping of drum 76 after the closing of switch 87 was a constant time interval, independent of the speed of rotation of drum 76. This constant time interval could therefore result in variations in the position of card 44C when drum 76 comes to a halt, so that there may be some difficulty in the operation of card engaging apparatus 94 engaging clip 79 on the edge of each card 44.

Figure 5:
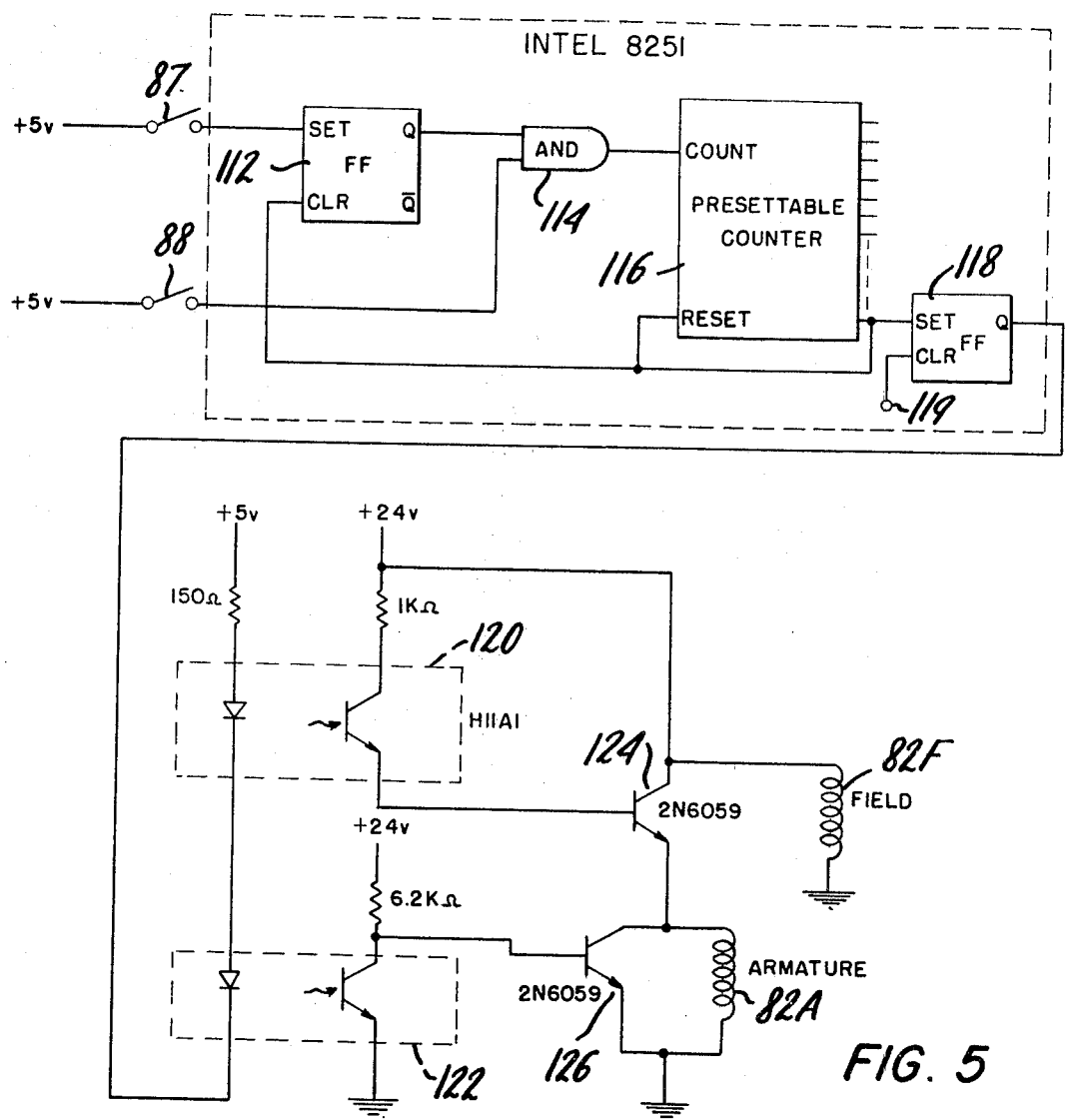
FIG. 5 is a circuit diagram illustrating a portion of the control circuit for the film positioning apparatus of FIG. 3.

In accordance with the present invention, there is provided an improvement in the control of the drum rotation to provide a more accurate stopping location, which is independent of the rotational speed of drum 76. In addition to the switch 87, which detects the selection of one of the cards 44 in drum 76, there is provided a switch 88 which closes in response to the passing of each of the teeth on idler gear 85 connected to drum gear 86. Using the circuit shown in FIG. 5, it can be seen that starting from the time of the closing of switch 87, a presettable counter 116 is provided with a series of pulses corresponding to the passage of each of the teeth of gear 85 past switch 88. A conventional flip-flop 112 is set by the closing of switch 87 and cleared when counter 116 has received a selected number of pulses. The pulses from switch 88 are provided to counter 116 through AND gate 114. The output of the counter 116 change state when a selected number of teeth have passed switch 88 and the corresponding number of pulses have been provided to the input of counter 116. This output sets flip-flop 118 whose output causes the rapid stopping of motor 82 by use of the motor control circuit also shown in FIG 5. Optically coupled transistors 120 and 122 respond to the setting of flip-flop 118 by changing from the conductive to the open condition. Opening of transistor 120 causes the opening of transistor 124 and discontinues the supply of positive voltage to armature coil 82A. Positive voltage is still supplied to the field coil 82F of motor 82. The opening of transistor 122 causes a positive going voltage to be supplied to transistor 126 causing that transistor to conduct and momentarily short circuit armature coil 82A. Motor 82 is then configured as a generator with a short circuit load. This load causes the motor to abruptly come to a stop, thereby stopping the motion of drum 76 at an appropriate position for arm 92 to engage the selected card 44. Since the current in armature coil 82A is caused by the generator effect, and no further current is provided to armature 82A, since transistor 124 is in a nonconducting state, the motor no longer turns until flip-flop 118 is reset by applying a control pulse to terminal 119.

Those skilled in the art will recognize that it is possible to use microprocessor 36 to perform the functions formed by discrete digital components 112, 114, 116, and 118. In such a configuration switches 87 and 88 can be arranged directly as inputs to the microprocessor, and an appropriate program can be provided in read only memory 40 to control the operation of microprocessor 36 to perform the functions of the logic circuits and provide an appropriate output signal for controlling the operation of motor 82.

Figure 6:
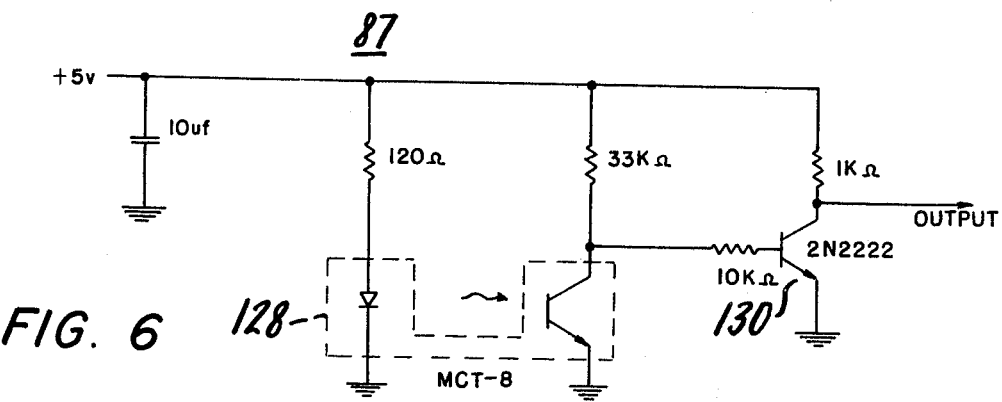
FIG. 6 is a circuit diagram illustrating an optical switch for use with the film selecting apparatus of FIG. 3.

FIG. 6 shows an alternate embodiment of switches 87 and/or 88 wherein an optical switch is used to provide the switching function, and generate the appropriate output signal. Optical switch 128 includes a photo diode and a photosensitive transistor whose optical path is caused to be interrupted by card 44 or the teeth of gear 85. The output of the switch provided by transistor 130 will be +5 volts when there is no obstruction in the optical path and will be at ground level when the optical path is obstructed. The use of an optical switch such as shown in FIG. 6 eliminates problems which may be associated with mechanical switches, such as wear and tear on switch contacts, which may result in noise and can effect the performance of the logic circuits used to control motor 82.

FIG. 4 illustrates the X-Y positioning mechanism of the FIG. 3 selection and positioning apparatus 38. After a particular film 44C has been selected from drum 76, it is moved by positioning arm 92 in X-Y coordinates in order to position a selected frame 108 in the operative position of the video detecting apparatus. In the embodiment illustrated, the video detecting apparatus includes a flying spot scanner 50, whose image 110 may be projected optically toward the photo detector 54. Detector 54 is contained with a housing 104 which has a window to permit light emanating from the flying spot scanner 50 and its associated optics, and passing through a particular film 44, to be projected into the photodetector tube 54. The flying spot scanner will generate a raster light pattern 110 on the film or the microfiche card 44. The X-Y positioning apparatus will move the microfiche card 44 so that the raster pattern 110, provided by the flying spot scanner, is positioned over the frame of the microfiche 44. In the illustrated embodiment, positioning arm 92 moves in the direction X under the influence of an unseen stepper motor and gear 98 located within housing 96. An additional stepper motor, also not shown, moves the positioning arm 92 in a track 100 in the Y direction indicated in FIG. 4. This X-Y positioning under the influence of stepper motors is controlled by digital signals provided from microprocessor 36 in accordance with the film address designated by computer 30 corresponding to, for example, the account number of the customer which has been entered on keyboard 32. The apparatus illustrated in FIGS. 3 and 4 includes an optical switch 83 arranged to detect the end 81 of the edge 79 on film card 44 as the film is withdrawn from rack 76. When the film is withdrawn to a particular position, the end 81 of edge 79 should interrupt the light path of optical switch 83, which has the same configuration as switch 87 shown in FIG. 6. The interruption of the light path provides a signal to microprocessor 36 indicating that card 44 has been successfully selected, engaged and retrieved by the engaging means 94 on the end of arm 92. In the event the card is not engaged and retrieved, the microprocessor receives no signal from switch 83 and reinitiates the card selection process. If the card is not selected after two or three tries, the microprocessor processor generates an error message for display on its own control 37.

Figure 7:
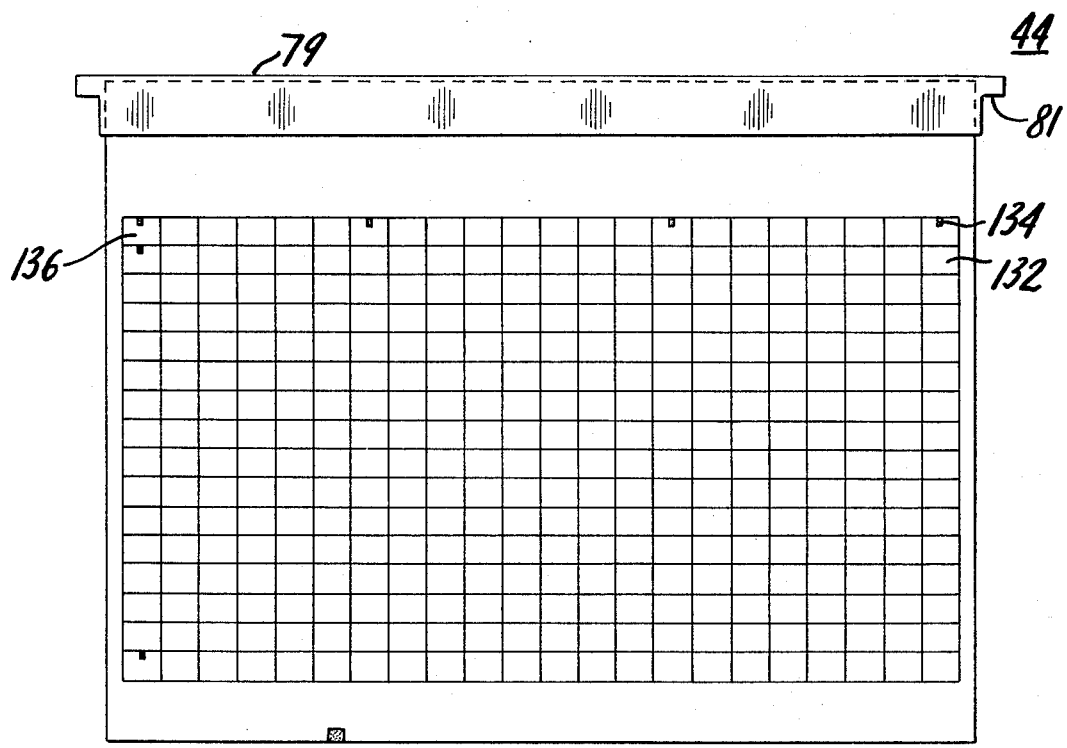
FIG. 7 is a drawing showing a micorfiche, usable in the apparatus of FIG. 3.

FIG. 7 illustrates the arrangement of individual frames on microfiche card 44. The card is provided with an edge clip 79, discussed above, which facilitates the selection of the individual card from the drum containing as many as hundreds of similar cards. Each edge clip has unique identifying notches to facilitate selection of the card by selecting apparatus 80. In each card, there is provided a plurality of frames 132 and within each frame there is provided a marker image 134. The marker image may typically be a rectangular image having a high contrast with the remainder of the frame. For example, if the frame is a negative image of a signature or multiple signatures, the marker image is preferably a clear transparent area on the frame. On the other hand, if the frame image is a positive image of signatures having predominantly transparent image background, the marker image would appropriately be a high density black image. The marker image is precisely located with respect to the information containing image in each frame. In the embodiment illustrated, there are provided 22 columns of frames each containing 16 frames so that the microfiche card contains a total of 352 individual image frames. In accordance with one aspect of the invention, a particular image frame, for example frame 136 is selected as a reference and is provided with no information containing image. This frame merely contains a high contrast marker on a background. The provision of one frame containing only the marker image facilitates the accurate positioning of the microfiche card and the positioning of the light pattern generated by the flying spot scanner with respect to the card images, as will be further explained.

Figure 8:
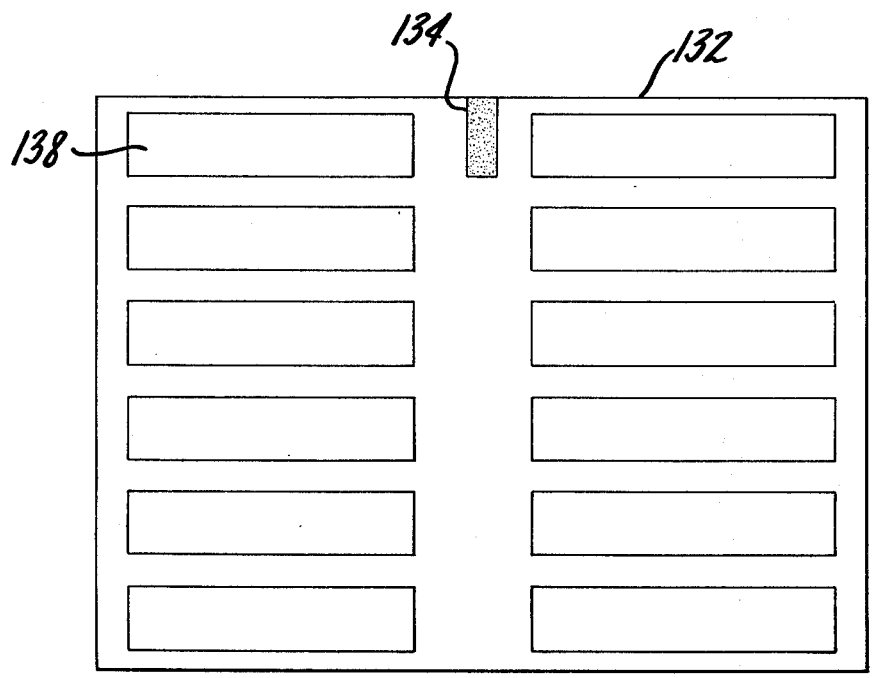
FIG. 8 is a drawing illustrating the use of an individual frame of the FIG. 7 micorfiche, for th storage of images of signatures.

FIG. 8 illustrates the format for a typical information containing frame 132. The marker image 135 is located at the center of the top of the frame. There are provided 12 image spaces 138 each appropriate for an image comprising an individual's signature. The signature spaces are appropriate for containing signatures reduced by a factor of 42 times. Three signature spaces are contained in each quadrant of the frame. In a system wherein multiple raster pattern sizes are available by variation of the deflection signals, it is possible and appropriate to provide a first raster pattern equal in size to the entire frame for locating marker image 134, and adjusting the location of the raster with respect to the image bearing film, and thereafter use a second and smaller raster pattern to scan an individual quadrant of the frame. When the second raster pattern scans a quadrant of the frame, it provides a video signal containing three individual signature spaces. Only one of these spaces corresponds to the desired signature to be displayed on display 66. The remaining two signatures can be removed from the displayed image by providing an appropriate blanking circuit which generates a video signal corresponding to no image during the raste scan intervals corresponding to the undesired signatures. Blanking can also be achieved by blanking the beam on flying spot scanner 50 during portions of the raster which are not to be displayed. In this way there can be provided on display 66 an image consisting of only the desired signature, whose address was specified by computer 30 in response to an entry on keyboard 32. Microprocessor 36 can be used to control the appropriate blanking signals in accordance with the film address. The microprocessor also provides the appropriate control signals to sweep generator 46 for generating the larger and smaller raster patterns and the raster position signals to place the smaller raster pattern in the appropriate quadrant of the frame. As previously noted, microprocessor 36 also performs the data analysis function which enables the microprocessor to determine the location of marker image 134 with respect to the ideal marker image location in the raster pattern and adjust the raster pattern location accordingly. The equipment to perform this process will be discussed below.

DEFLECTION SIGNAL GENERATOR

Figure 9:
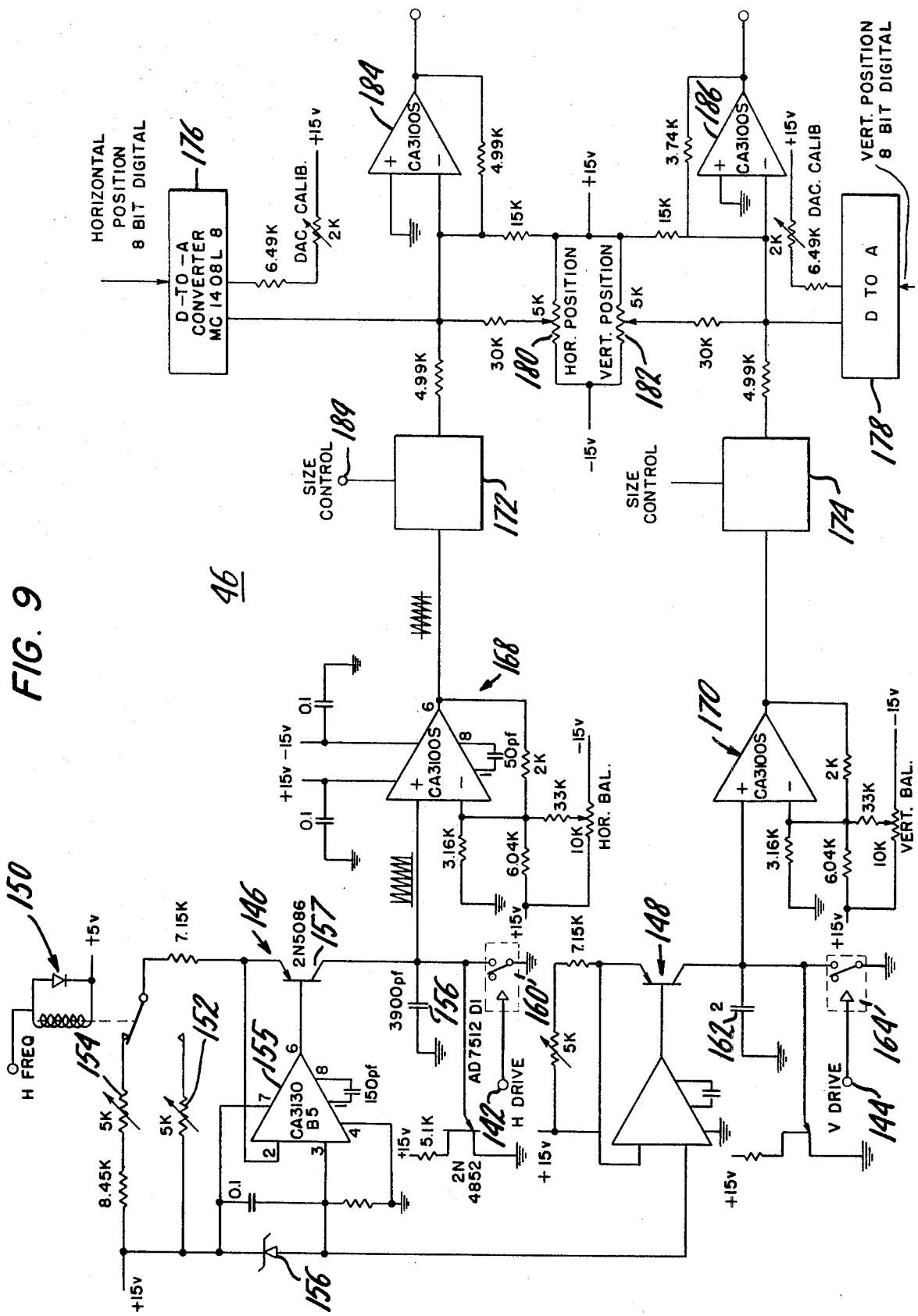
FIG. 9 is a schematic diagram illustrating the deflection signal generating circuit for the FIG. 1 apparatus.

FIG. 9 is a detailed schematic diagram of the deflection signal generator 46 for the FIG. 1 apparatus. The deflection signal generator generates the appropriate horizontal and vertical deflection signals for the operation of flying spot scanner 50. The deflection signals are generated in response to horizontal and vertical timing signals provided by timing generator 45 and also in response to signal regulating the choice of horizontal sweep frequency, the horizontal and vertical size of the sweep pattern, and the horizontal and vertical position of the pattern. There may be additionally provided circuits for rotating the raster pattern as will be discussed below.

The circuit illustrated in FIG. 9 can generate raster signals corresponding to standard 525 horizontal lines at a rate of 30 frames per second consisting of 60 interlaced ½ frames, or alternately can generate a 1,029 line raster rate. The choice of raster rate naturally depends on the frequency of the horizontal timing signals supplied to terminal 142 from timing generator 45 and also in accordance with the operation of switch 150 which chooses resistor 152 for the 1,029 line horizontal drive or resistors 154 for the 525 line horizontal drive.

Figure 10:
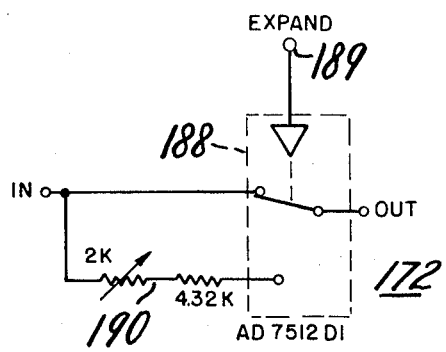
FIG. 10 is a schematic diagram illustrating one embodiment of the size control apparatus of the FIG. 9 deflection signal generating circuit.

Amplifying circuit 146, consisting of amplifier 155 and transistor 157 operates in conjunction with capacitor 156 to generate a ramp signal, which is rapidly reset by the closing of the switch 160 in response to the horizontal timing signal supplied to terminal 142. The circuit therefore generates the indicated output signal consiting of a 0 to 5 volt sawtooth signal. Differential amplifier 168 converts this signal into a balanced raster signal which is supplied to size control unit 172. Unit 172 consists of a variable resistance which regulates the voltage sweep of the balanced sawtooth pattern, and thereby changes the size of the resulting raster pattern on the flying spot scanner 50. FIG. 10 illustrates one embodiment of a size control unit 172 wherein the size can be one of two selected sizes according to the position of switch 188 which is controlled by a raster size signal supplied to terminal 189. In one position resistors 190 are placed in series with the sawtooth signal to attenuate the signal and obtain a smaller horizontal sweep on the flying spot scanner. In the other position no resistor is present in the circuit and a large raster results. Those skilled in the art will recognize that fully variable size or other ranges of size can be provided by other circuits.

The vertical deflecting signals are similarly generated by another circuit which includes amplifier 148 which operates in conjunction with capacitor 162 to generate a relatively slower sawtooth pattern, the frequency of which is regulated by vertical drive signals supplied to terminal 144 of switch 164. Amplifies 146 and 148 are provided with 6.4 volt signals from the 15 volt power supply by the use of a voltage dropping zener diode 156. The vertical deflection signal circuit includes differential amplifier 170 and size control unit 174, which are similar to the units provided for the horizontal deflection signal circuit.

In accordance with the invention, digital signals from microprocessor 36 corresponding to a desired raster position are supplied to digital-to-analog converter 176. These signals provide an output analog voltage corresponding to the desired horizontal position of the raster pattern. The analog signal is added to the sawtooth signal at the output of size control unit 172 and the combined signals provided to output amplifier 184. Potentiometer 180 provides a horizontal position adjustment.

Vertical positon control signals from microprocessor 36 are also provided to digital-to-analog converter 178 and are added into the vertical deflection sawtooth signals in similar manner. Likewise potentiometer 182 is provided for adjusting the vertical position of the raster pattern. The combined vertical signals are provided to output amplifier 186.

In addition to output amplifiers 184 and 186 there are provided power amplifiers to increase the current of the horizontal and vertical deflection signals to a value adequate to drive the deflection coils of the flying spot scanner.

Figure 11:
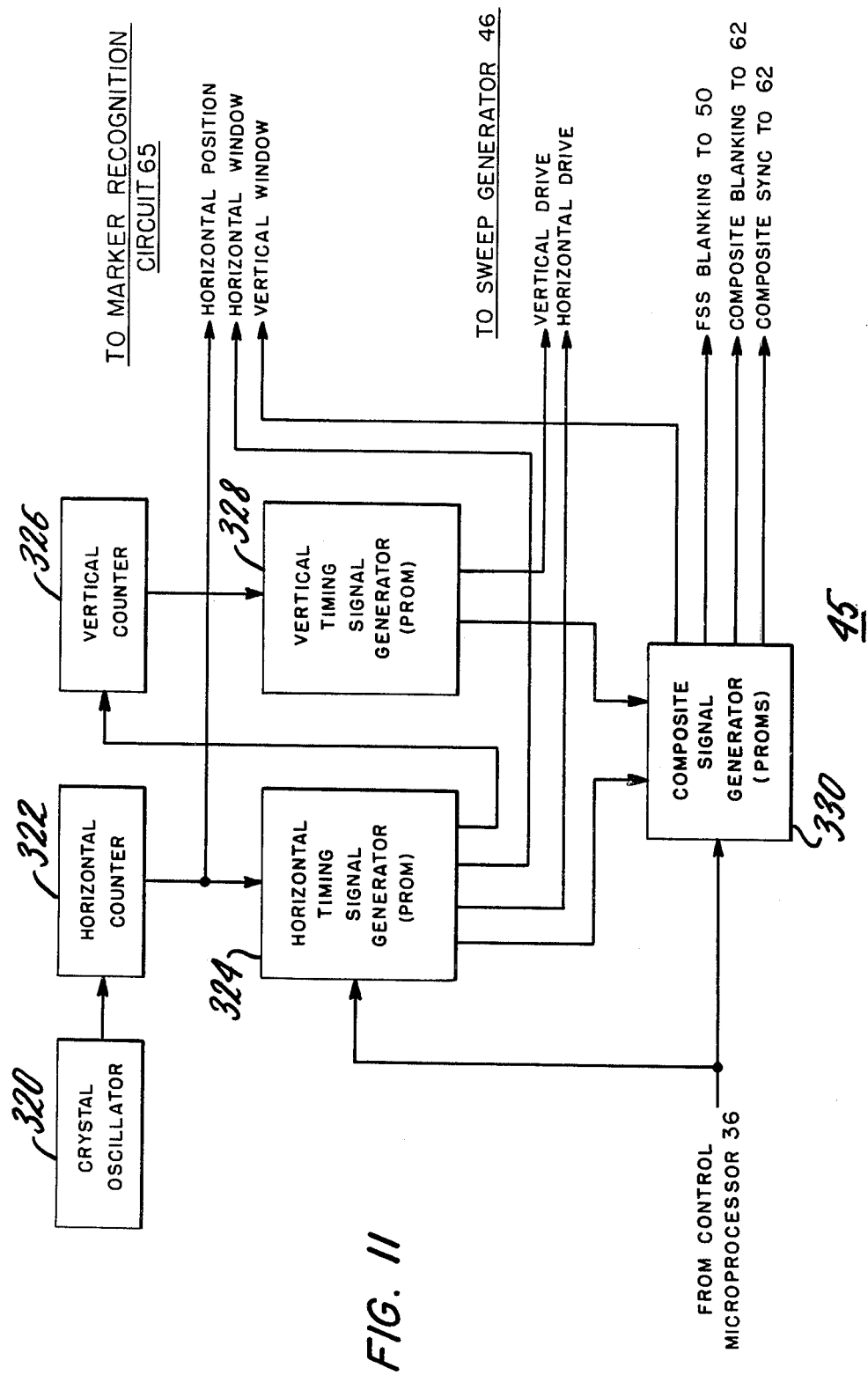
FIG. 11 is a block diagram illustrating a deflection timing signal generating circuit usable with the circuit of FIG. 9.

FIG. 11 is a block diagram illustrating the functional components of timing signal generator 45, which provides horizontal and vertical deflection timing signals to terminals 142 and 144 of the deflection signal generator 46. In addition, the timing signal generator of FIG. 11 generates composite blanking and sync signals for circuit 62 and timing signals for marker recognition circuit 65. Oscillator 320 provides basic timing signals which are lowered in frequency by counters 322 and 326. Programmable read-only memories 324 and 328 convert timing signals from counters 322 and 326 to appropriate drive signals for sweep generator 46. Signal generator 330 is programmed to provide the appropriate synchronization and blanking signals.

Figure 12:
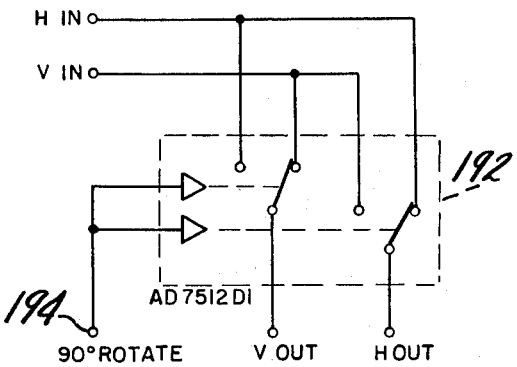
FIG. 12 is a schematic diagram illustrating one embodiment of a raster rotation control circuit usable with the FIG. 9 deflection signal generating circuit.

FIG. 12 illustrates a circuit for providing a 90° rotation of the horizontal and vertical deflection signals. By the use of circuit 192, a signal provided to input terminal 194 controls the electric switches, interchanging the terminals through which the horizontal and vertical deflection signals are provided, so that the deflection raster pattern of the flying spot scanner can be rotated through 90° in order to accommodate an image which is in a rotated position on a microfiche. This rotation, when required for a particular image, can be indicated by address information provided to microprocessor 36, and microprocessor 36 will thereby provide an appropriate control signal to terminal 194.

Figure 13:
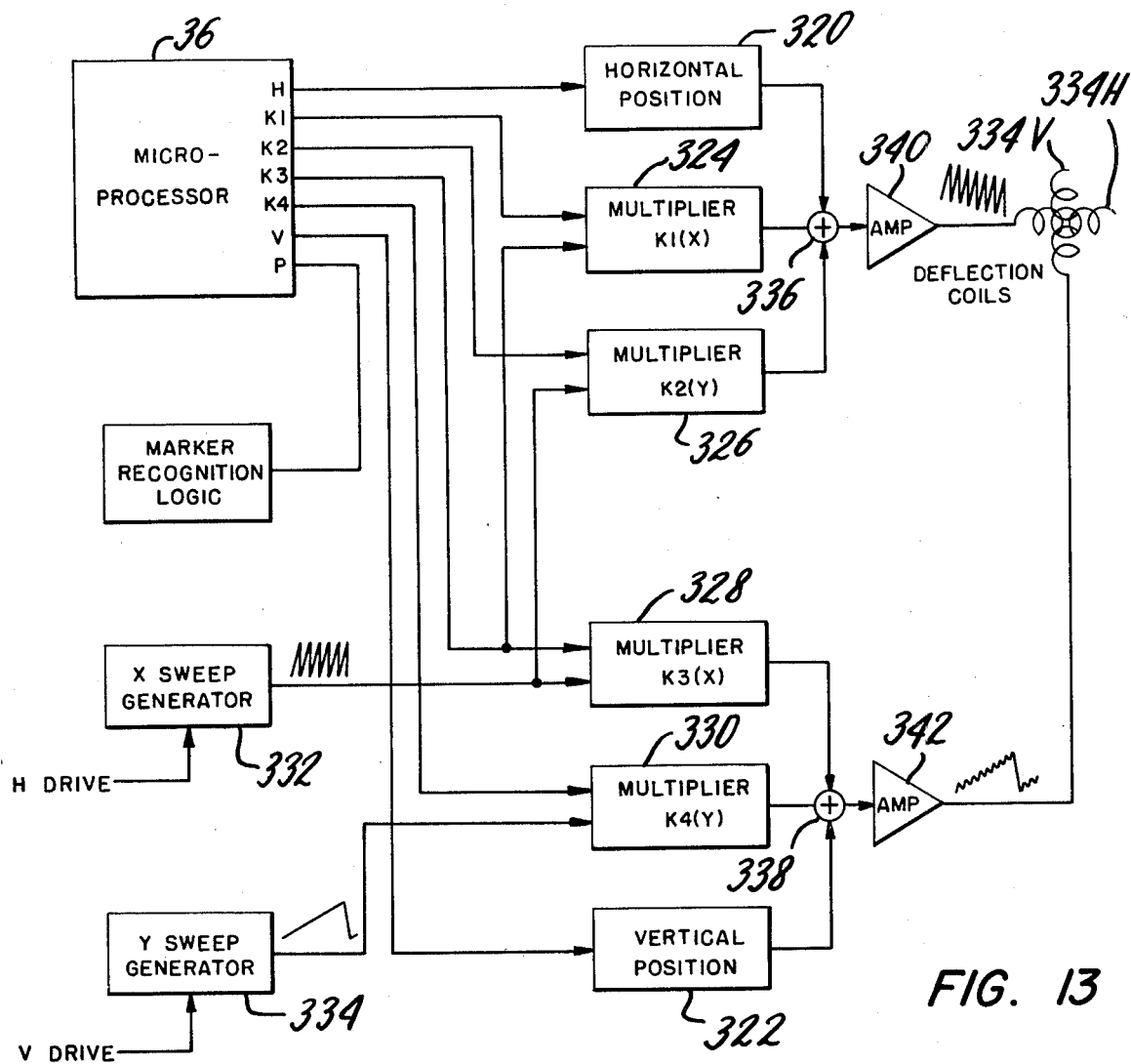
FIG. 13 is a block diagram illustrating one embodiment of a raster rotation circuit usable with the deflection signal generating circuit of FIG. 9.

FIG. 13 illustrates a more versatile raster rotation device. The FIG. 13 device provides for rotation of the raster pattern of the flying spot scanner by an arbitraty angle. The orignal generated horizontal and vertical deflection signals are provided to a combiner which can add portions of the horizontal deflection signals, in varying amplitudes and polarities, into the vertical deflection signal; and can likewise add portions of the vertical deflection signal into the horizontal deflection signal. Thus, by providing a mixture of horizontal and vertical deflection signals to both the horizontal and vertical deflection terminals of flying spot scanner 50, the raster can be caused to assume any arbitrary angle with respect to the tube.

The FIG. 13 apparatus is capable of performing the deflection signal mixing function necessary to obtain arbitrary raster rotation. As indicated, microprocessor 36 provides signals representative of the desired horizontal and vertical position to D to A converters 320 and 322 respectively, and also supplies multiplication constants K1, K2, K3 and K4 to multipliers, 324, 326, 328 and 330. The constants are used to multiply the horizontal and vertical deflection signals. These constants are proportional to the sine and cosine of the desired rotation angle for the raster. Thus portions of both X and Y deflection signals are supplied by summers 336 and 338 to X and Y output amplifiers 340 and 342 and thence to deflection coils 334H and 334V.

In order to use either the FIG. 12 or FIG. 13 raster rotation devices it is necesary to provide output power amplifiers for both the horizontal and vertical deflection signals which can accomodate the full range of frequencies experienced in the horizontal deflection signals. Likewise, it is necessary to provide a cathode-ray tube and deflection coils which can use high frequency signals for beam deflection in either plane.

Figure 14:
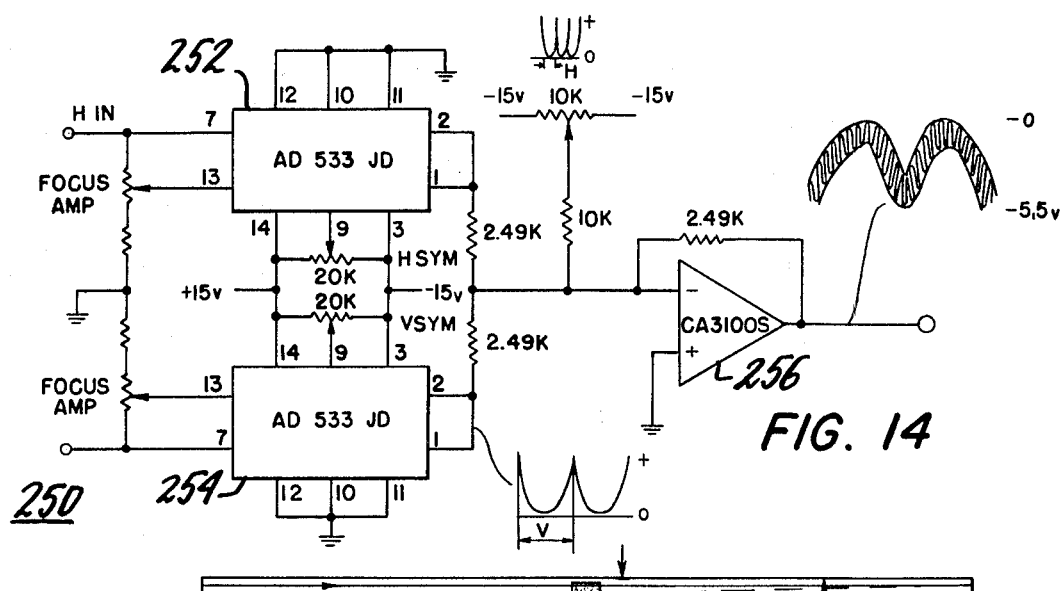
FIG. 14 is a schematic diagram illustrating a dynamic focus control signal generating apparatus usable with the deflection signal generating apparatus of FIG. 9.

FIG. 14 is a circuit diagram of apparatus 250 for providing dynamic focus control signals for the high voltage power supply 52 for flying spot scanner 50. It is a well known feature of flying-spot scanners that spot defocusing occurs as the electron beam is deflected from its nominal position near the center of the tube. This defocusing tends to increase the spot size. When 525 line rasters are used, the spot size is adequately small, even with defocusing, so that interference between lines does not occur. When a 1,029 line raster is used the increased spot size is significant with respect to the distance between raster lines. Also deflection of the electron beam to the edges of the tube can result in defocusing which is significant. even to the 525 line raster. In these cases, it is appropriate to provide dynamic focus control, which refocuses the electron beam by variation of the high voltage applied to the tube in accordance with the deflection positon of the electron beam. The circuit 250 of FIG. 14 includes integrated circuits 252 and 254 which generate output signals proportional to the square of the magnitude of the horizontal and vertical deflection signals. These output signals are combined in output amplifier 256 to form a composite dynamic focus control signal, which is illustrated in the drawing. This signal can be supplied to the high voltage power supply for flying spot scanner 60, and modulates the high voltage of the flying spot scanner to provide dyanamic focusing of the electron beam and maintain small spot size, particularly when the 1,029 line scan is used.

RASTER POSITION CORRECTION

As noted above in connection with the description of the raster signal generating circuit of FIG. 9, horizontal and vertical digital raster position signals are supplied to the sweep generator circuit in order to move the raster position to correspond to the position of a desired frame on a film. In addition, the circuits of FIGS. 12 and 13 may be used to rotate the raster so that it corresponds with the angular orientation of the desired frame of the film. The determination of the required raster location adjustment and rotation are made by microprocessor 36 acting under a program. Microprocessor 36 is supplied with digital data, derived from the video signal by the marker recognition logic 65. The digital data corresponds to the location of the marker image on the desired or reference frame of the film.

Figure 15:
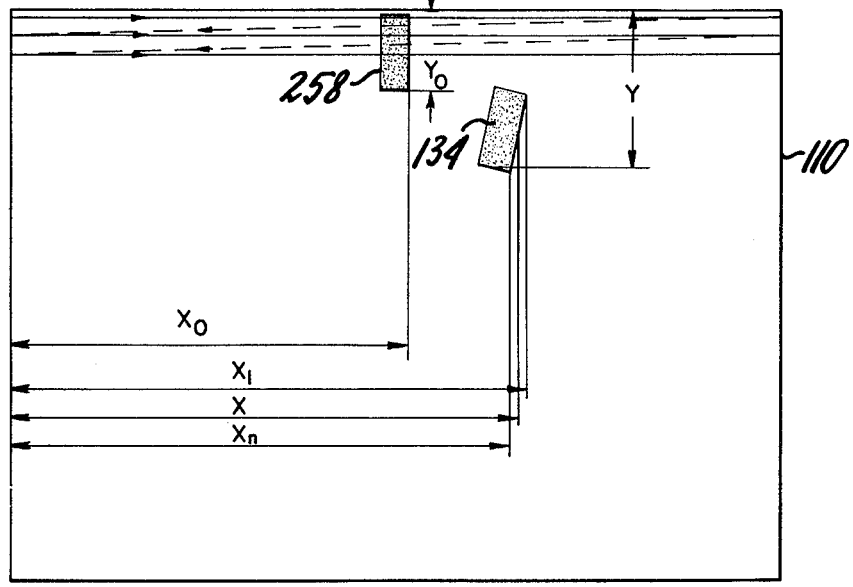
FIG. 15 is a drawing illustrating the operation of the programmed microprocessor and marker detecton logic of the FIG. 1 apparatus for analyzing the location of a marker image.

Referring to FIG. 15, there is shown an area 110 corresponding to the raster scan area on a film by the flying spot scanner 50 used in the FIG. 1 apparatus. The area 110 is also shown by dotted lines in The FIG. 4 drawing. Within area 110 there is located the marker image 134 corresponding to the marker on one of the frames of the microfiche card shown in FIG. 7. Marker image 134 may either be the marker image on the reference frame or the marker image on the desired information bearing frame. As is evident from FIG. 15, marker image 134 is not located at the ideal marker position 258 in the raster pattern, and is also oriented at a different angle from the desired frame orientation, so that the edges of the marker image 134 are not oriented parallel and perpendicular to the horizontal direction of raster scanning.

Figure 17:
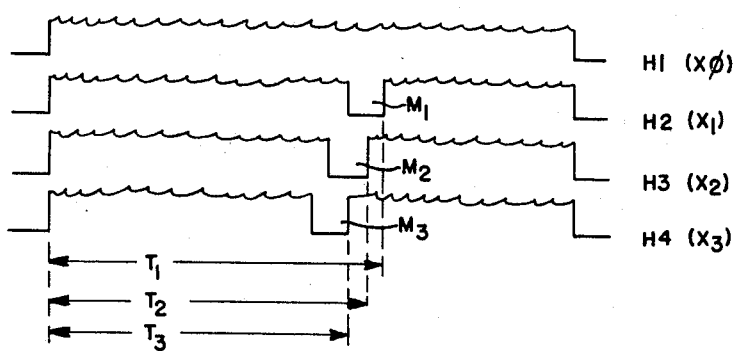
FIG. 17 is a graph illustrating several lines of a video signal including signal portions representative of a marker image.

When a frame containing marker image 134 in the orientation shown in FIG. 15 is scanned in a raster pattern, it can be determined by observation of the resulting video signal that the marker image is displaced in both the X and Y directions from the nominal location of the marker image in the raster area, and it can also be determined that the marker image has an angular orientation which is different than the desired orientation. Successive video signal outputs for individual horizontal scan lines of the raster are illustrated in FIG. 17. During the first horizontal scan H1, as shown in FIG. 17, the marker image is not intercepted by the scanning light beam at all and the video signal represents a dark level (or a light level) depending on the film polarity. During the second scan H2, the flying spot intercepts marker 134. This is indicated by area M1 in FIG. 17. During the third and successive scan lines, portions of the marker are again intercepted by the flying spot. The vertical location of the marker image with respect to the raster can be determined by the number of horizontal scan lines in the raster pattern before the flying spot intercepts the marker. The horizontal position of the marker with respect to the raster can be determined from the timing between the start of each horizontal scan and the intercept of the marker. The angular orientation of the marker image with respect to the raster can be determined from the difference between horizontal positions of the marker on successive horizontal scans.

Figure 18:
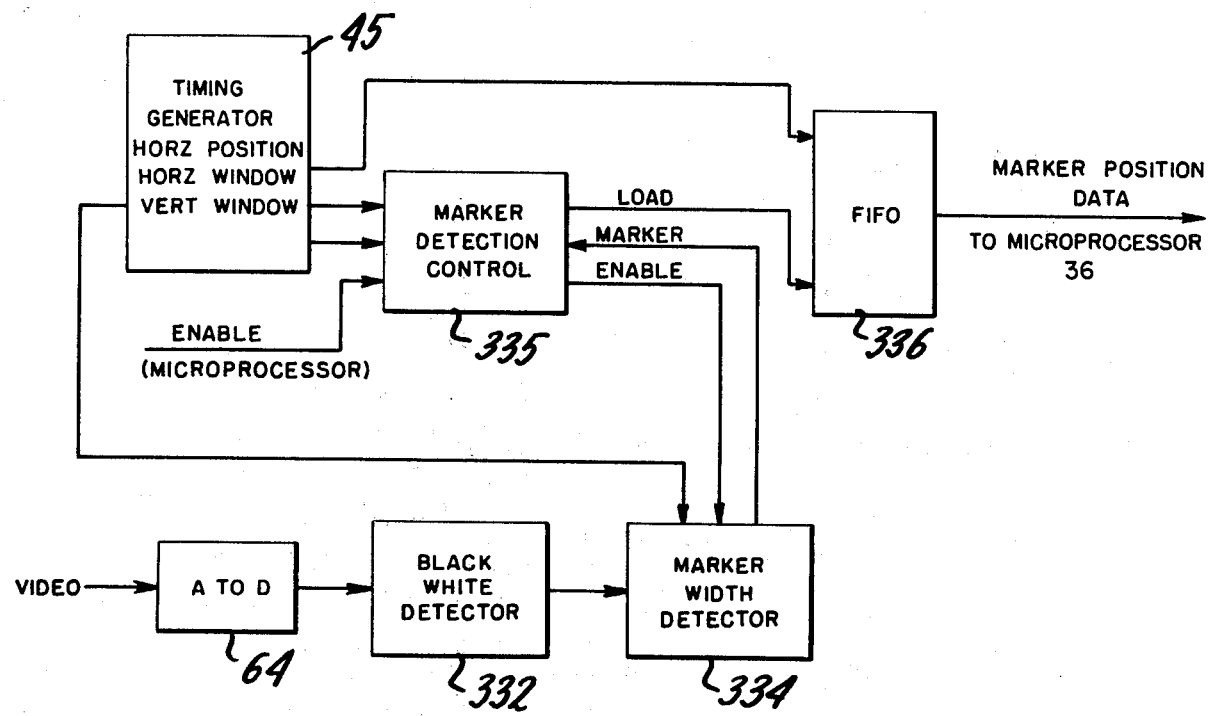
FIG. 18 is a block diagram illustrating the configuration of the marker recognitin circuit and peripheral equipment for analyzing the FIG. 17 maarker image representative video signals.

The apparatus shown in FIG. 18 can be used to determine the vertical, horizontal and angular positions of the marker image from the video signal. The video signal is provided to A to D converter 64, which converts the video signal into a digital signal. The digital signal is converted to a binary signal by detector 332 wherein all incremental time intervals of the video signal having a voltage greater than a selected threshold V are assigned the value "1" and time intervals of the signal having a voltage below the threshold are assigned the value "0". Thus, the necessary measurements for determining the marker position can be made only by counting the number of time intervals having a value of "1" before those having a value of "0". Discrimination of the marker image from other images is performed by width detector 334 which must receive a selected number of successive "0" time intervals before making a decision that the marker image representative signal portion has been encountered.

When width detector 334 determines that a segment of a marker image has been detected, a marker image signal is sent to marker detection control ciruit 335. Circuit 335 determines the clock count from a selected deflection timing signal, and supplies that count as a marker position signal to first-in, first-out memory 336 and eventually to microprocessor 36. In order to minimize the possibility of false marker detection, a horizontal and vertical window may be defined corresponding to certain times with respect to the deflection timing signals within which the marker is likely to be detected. The marker detection control 335 and width detector 334 can then be activated to respond only to marker representative signals within the window. This minimizes false marker detection alarms. Further assurance against false marker position signals is implemented in microprocessor 36 which compares the value of each marker position signal to previously received signals and disregards any signal which has an unlikely value, e.g., far removed from the average of previously received signals.

In order to provide an indication of vertical positioning of the marker, memory 336 may be provided with data representing the identity of the horizontal scan lines on which the marker image is detected. From the timing data and scan line identification, microprocessor 36 can determine the horizontal and vertical position of the marker image with respect to the video detector. In addition, using deviations of marker timing data between scan lines, it is possible for microprocessor 36 to determine the angular orientation of the marker image. This information can be used to generate raster angle control signals to be used in the raster rotation apparatus of FIG. 13.

Microprocessor 36 generates raster position control signals from the horizontal and vertical data signals. The horizontal signals $X_1$ to $X_n$ can be averaged to obtain the X correction. The last line Y on which a marker image is encountered determines the Y position. Corrections to properly locate the marker with respect to the image detector by moving the raster deflection pattern are generated by microprocessor 36 as digital horizontal and vertical position signals and supplied to D to A converters 176 and 178 in the FIG. 9 circuit.

In a more complex system it is desirable to rotate the raster pattern in addition to changing its location. In this event, the orientation of marker image 134 with respect to raster 110 must be determined by determining the difference between successive values of the horizontal position data signal X. From these values, it is possible to generate a signal representative of the rotation of marker 134 from its nominal orientation, illustrated as 258. These rotation information signals can be converted by the microprocessor 36 into appropriate multipliers K1, K2, K3 and K4 which are used in the apparatus of FIG. 13 to derive appropriate horizontal and vertical deflection signals from the nominal horizontal and vertical deflection signals generated by the deflection signal generator shown in FIG. 9. The horizontal and vertical position signals are also provided into the FIG. 13 circuit so that position as well as orientation correction of marker image 134 can be achieved.

In many applications, where photographic images of a signature or person are to be provided to the display, it may not be necessary to provide rotation of the image. In such systems, it is usually adequate to provide correction of the position of marker image 134, and the amount of rotation experienced in ordinary film production will not require image rotation to make the image usable. In certain applications, however, it may be desired to provide digital information storage on microfilm type cards. In such situations, the microfilm image must be read by a flying spot scanner to generate digital data. The digital data may be stored on the film image in strips 260, 262 shown in FIG. 16. In such applications, it is important that the flying spot scanner be accurately aligned with the strips of digital information bearing images, so that the flying spot scanner does not jump from one strip to the next while reading the information. In this type of system, accurate orientation of the film image with respect to the raster is important and the rotation circuit shown in FIG. 13 would be most useful.

Figure 16:
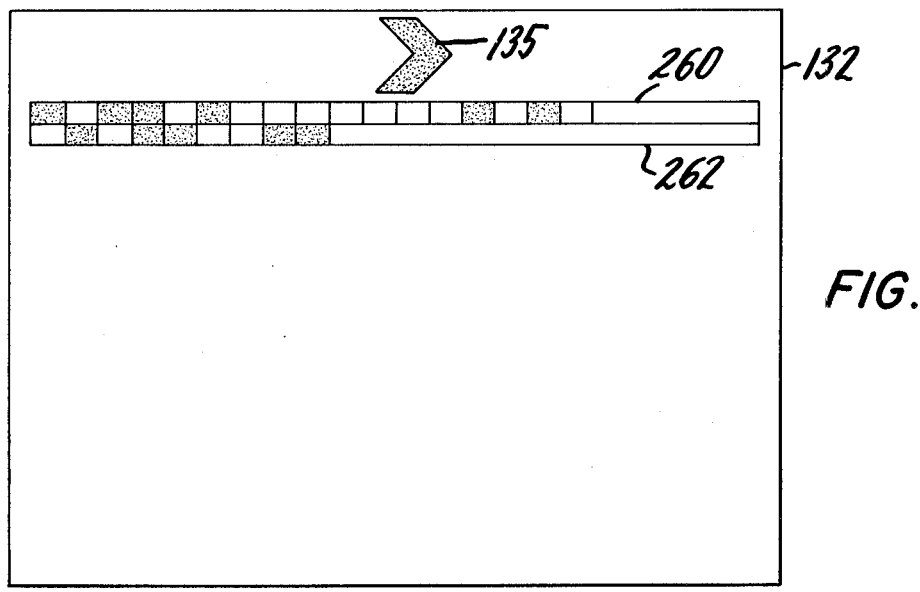
FIG. 16 is a drawing illustrating a microfiche frame having lies of encoded digital data.

The frame illustrated in FIG. 16 has a chevron shaped marker image 135 instead of the rectangular marker image 134 shown in FIG. 15. This image shape is slightly more complex for analysis by microprocessor 36, but is less subject to ambiguity. In this respect, vertical location without ambiguity can be determined by computing the intersection of the two lines formed by the trailing edges of the image.

VIDEO PROCESSING CIRCUITRY

Figure 19:
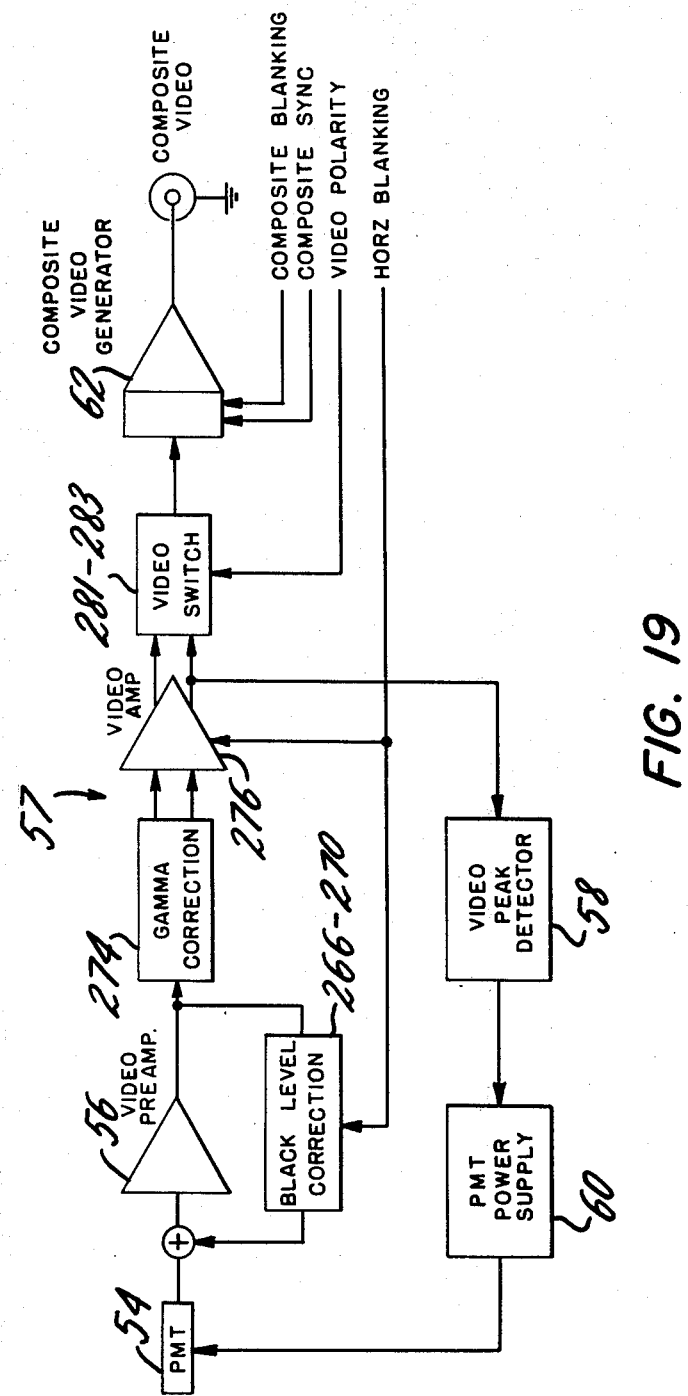
FIG. 19 is a block diagram illustrating the video signal processing apparatus of the system of FIG. 1.
Figure 20A:
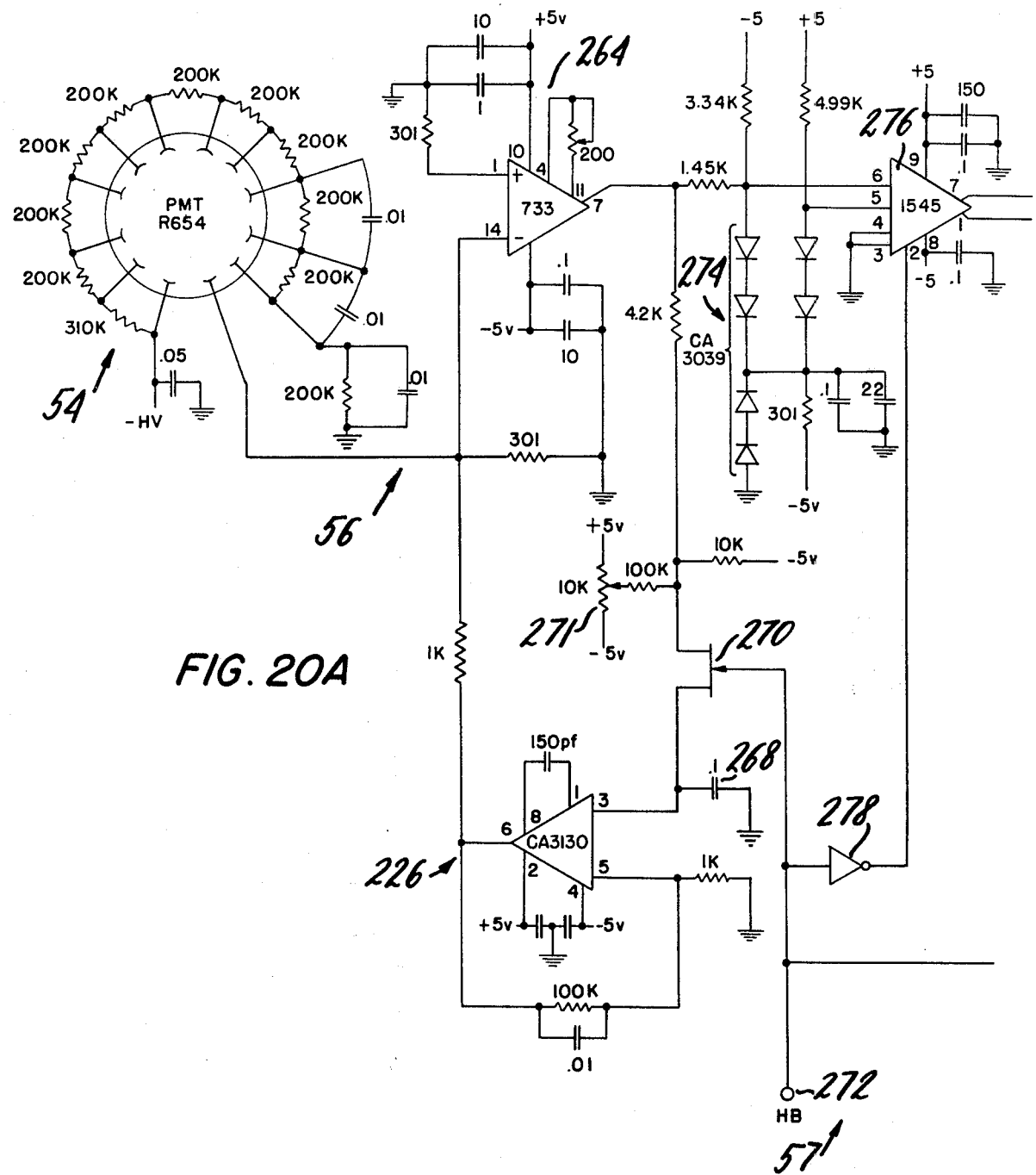
FIG. 20 is a schematic diagram of the FIG. 19 video signal processing apparatus.
Figure 20B:
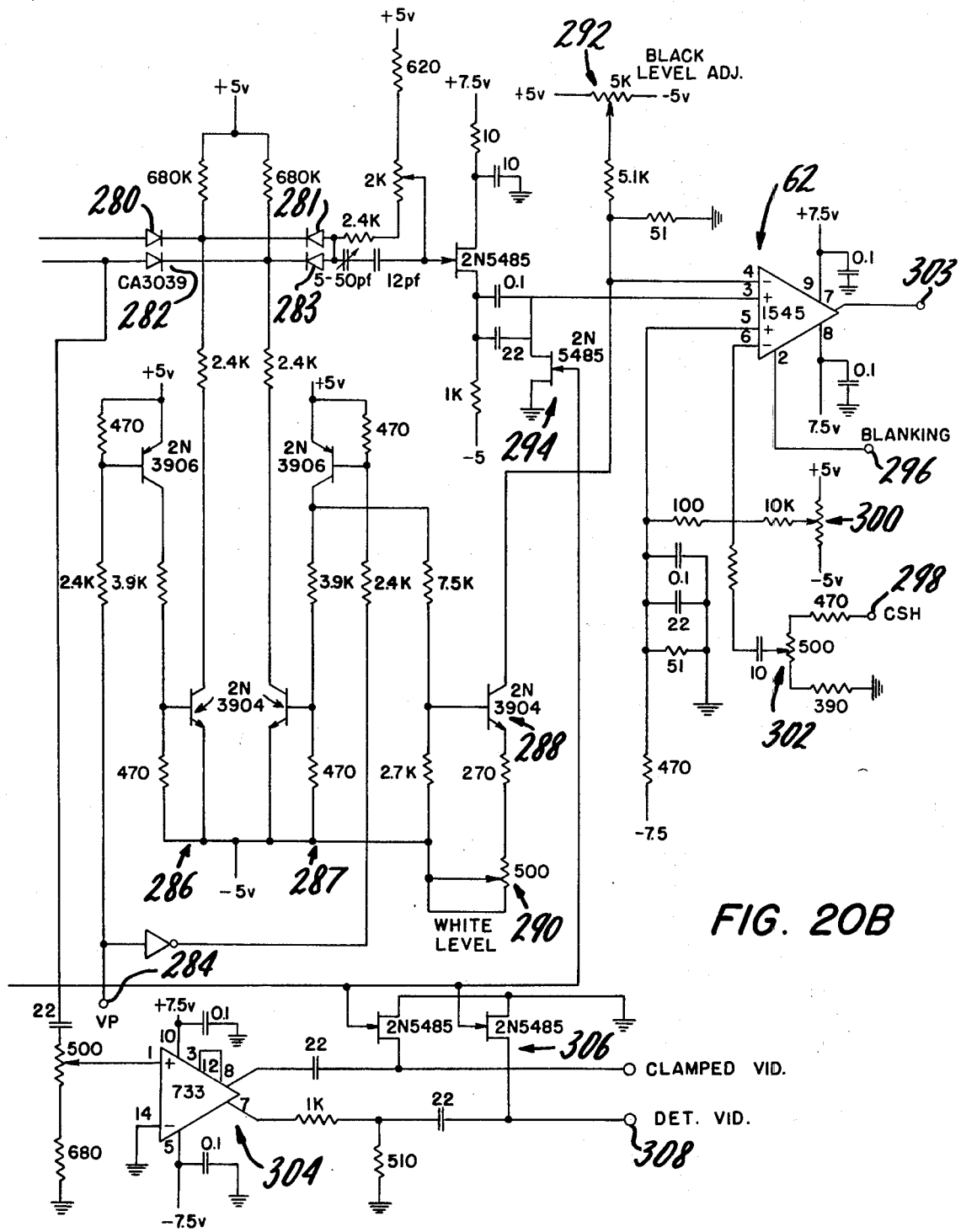
Figure 21:
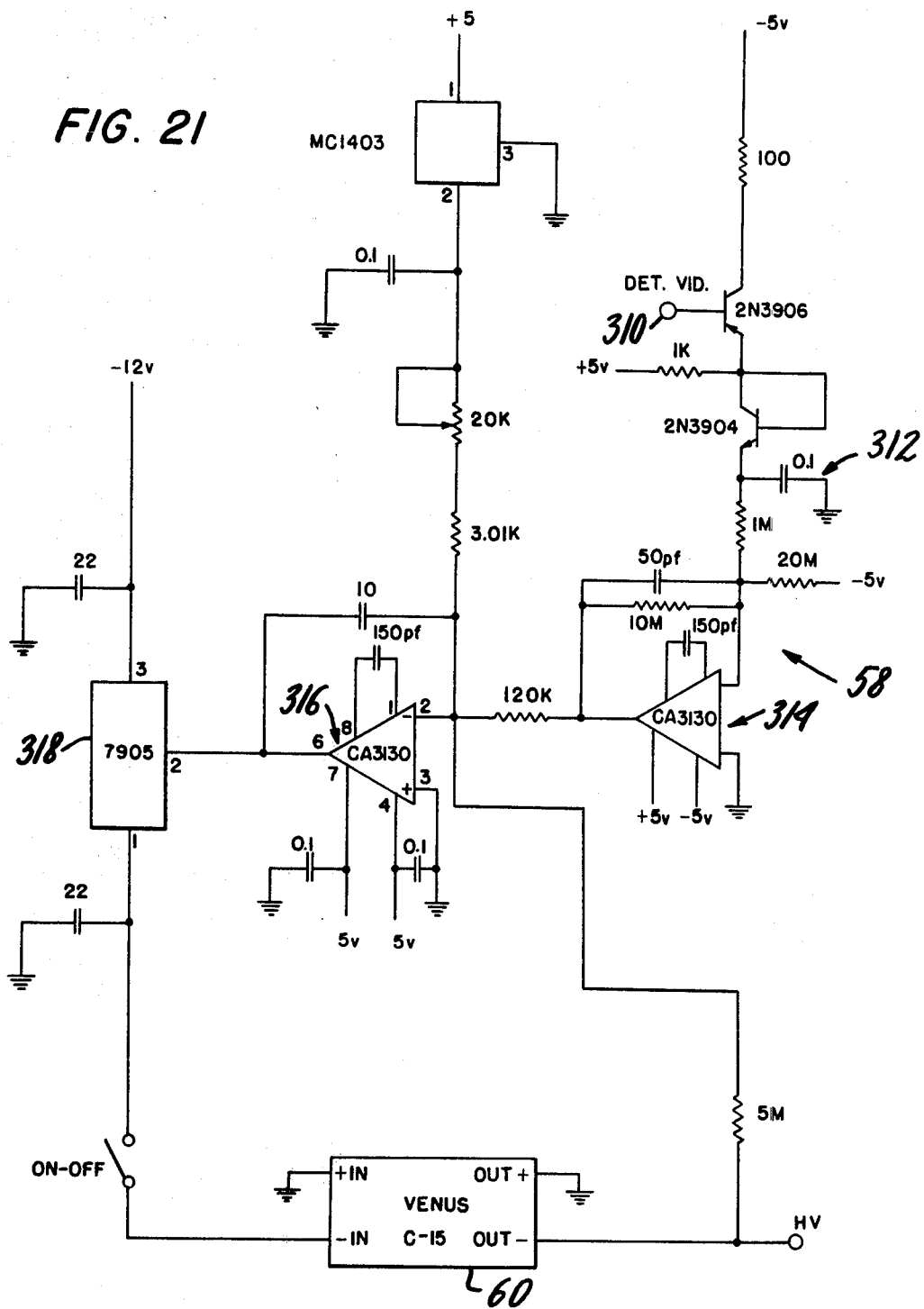
FIG. 21 is a schematic diagram illustrating apparatus for controlling the high voltage of the photomultiplier tube of the FIG. 20 apparatus.
Figure 10:
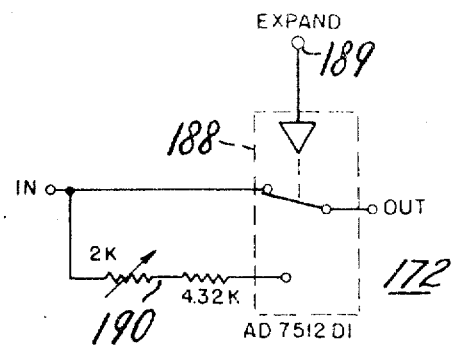
Figure 12:
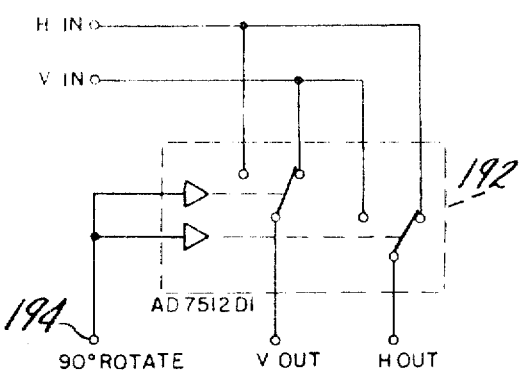
Figure 13:
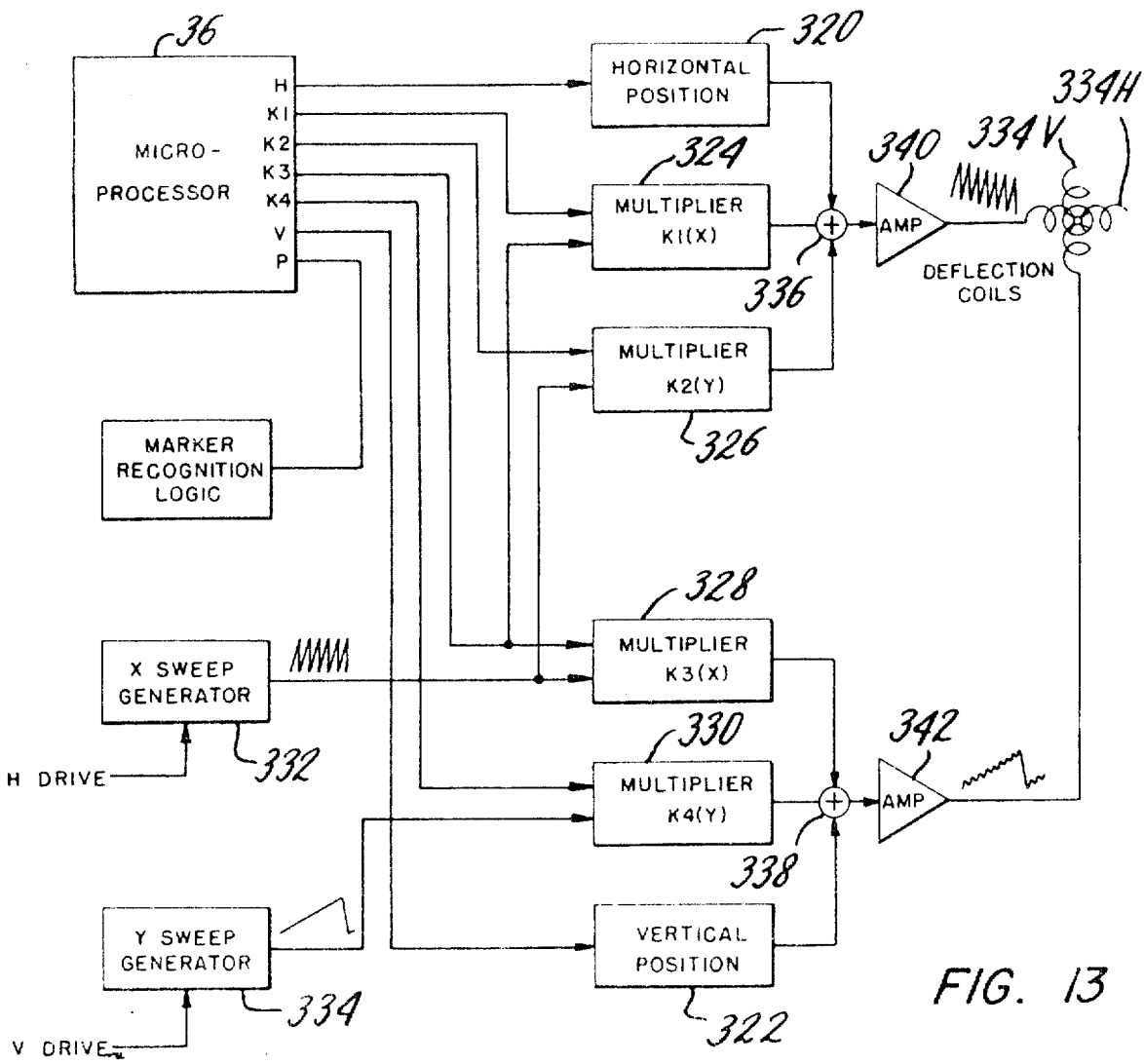

The video processing circuitry used in the film reading equipment of FIG. 1 is shown in more detail in FIGS. 19, 20, and 21. FIG. 19 shows the functions performed by the video processing circuitry in block diagram. The output of the photo multiplier tube is supplied to a video preamplifier 56 which is provided with a black level correction circuit 266–270. The black level correction circuit 266–270 operates to adjust the output of the video preamplifier to the signal black level during the horizontal blanking intervals. This establishes the black signal level to correspond to zero light input. The signal is then provided to a gamma correction circuit 274 and a video amplifier 276. The inverted output of the video amplifier 276 is supplied to a video peak detector circuit 58 which detects the peak of the inverted video signal, and thereby determines the maximum level of the video signal. This level is supplied to the photo multiplier tube power supply 60 as a control input, and is used to adjust the voltage supplied to the photo multiplier tube 54 in accordance with the density of the film actually being viewed. Both the normal and inverted outputs of video amplifier 276 are supplied to video polarity switch 281–283 which is controlled by a video polarity control signal. The appropriate polarity of the video signal is selected according to a control signal representing film polarity and the signal with selected polarity is provided to the composite video generator 62 wherein composite synchronization and blanking signals are added to the video signal to provide a composite video output.

FIG. 20 shows a circuit for implementing the functions of the FIG. 19 diagram. The black level correction circuit includes a switching transistor 270 which is closed by a horizontal blanking interval signal supplied to terminal 272, and when closed connects the output of amplifier 264 to capacitor 268. This performs a "sample and hold" function for the output of amplifier 264 during the horizontal blanking interval. The signal stored in capacitor 268 is provided by amplifier 266 as an input to amplifier 264 and adjusts the output of amplifier 264 to a black level for input signals equal to the output of photomultiplier 54 during the no-light blanking intervals. This level can be adjusted by potentiometer 271.

Gamma correction circuit 274 consists of an arrangement of diodes and associated resistors as shown in FIG. 20.

The gamma corrected video signal is supplied to amplifier 276 which is also provided with inverted horizontal blanking signals from inverter 278. The outputs of amplifier 276, consisting of normal and inverted video signals, are at ground level during the blanking intervals and at normal signal level during the remaining time. A video polarity control signal is provided to terminal 284 and controls the operation of transistor pairs 286 and 287. One of these transistor pairs is turned on and the other turned off for each condition of the polarity signal. In accordance with which transistor pair is turned on, the video signal is allowed to flow either through diode pair 280, 281 or through diode pair 282, 283. The other pair of diodes is back biased so that no signal passes. Thus, either the normal or inverted output of amplifier 276 is provided to output composite video signal generating amplifier 62. Blanking switch 294 clamps the video signal to ground level during horizontal blanking intervals at the input to amplifier 62. Potentiometers 290 and 292 provide signal level adjustments for the video signal. Transistor 288 switches the level adjustment potentiometer in accordance with the input polarity signal. Also supplied to output amplifier 62 is a composite synchronization signal supplied from timing signal generator 45 over terminal 298. The level of the synchronization signal is adjusted by potentiometer 302. A blanking signal is supplied by terminal 296 to switch amplifier 62 between video and synchronization inputs. Potentiometer 300 adjusts the front and back porch levels of the output video signal. The output video signal is provided to output terminal 303 from amplifier 62 and may be supplied to display 66.

The inverted video signal output from amplifier 276 is also provided to amplifier 304, which has two output channels. Both output channels are clamped to ground level by switches 306 which are closed during the horizontal blanking intervals. One video signal is provided through terminal 308 to terminal 310 shown in FIG. 21 for use in controlling the high voltage supply to photomultiplier tube 54. The other output is a clamped video signal which is used for an input to the video A to D converter, or for conversion to digital data when the film image represents data. The circuit shown in detail in FIG. 21 makes use of the auxiliary video output signal from amplifier 304, which has inverted polarity, to adjust the power supply to the photomultiplier tube in accordance with the density of the film which is being viewed. Peak signal level of the inverted signal represents maximum light intensity of minimum film density. Capacitor 312 becomes charged in accordance with the peak magnitude of the inverted video signal, and the resulting voltage is supplied to amplifiers 314 and 316 for use as a control signal for power supply voltage control 318 which is connected in the power supply for high-voltage power supply 60, which supplies high voltage to photomultiplier tube 54. By the use of this circuit, the high-voltage supply for the photomultiplier tube is adjusted according to the minimum density of the film being viewed, and therefore the output video signal is automatically adjusted to compensate for changes in film density which are a result of film processing variations. It is therefore not necessary to have a highly controlled processing system for all films which are to be used with the display apparatus.

SYSTEM OPERATION

A further understanding of the operation of the microfilm display apparatus of the invention will be had by the following description of typical system operation using a system of the type shown in FIG. 1 for displaying a microfiche stored signature.

System operation is initiated by an operator entering an account number or other identification information into keyboard 32. This information is supplied to general purpose computer 30 which retrieves a film address from data memory 34. The film address includes bits representing a particular microfiche card to be selected, the film polarity, the frame on the film corresponding to the desired signature and the signature location on the frame.

The signature address signal is provided to microprocessor 36 by computer 30. Microprocessor 36 operates under a control program stored in programmable read-only-memory 40. The microprocessor starts the display operation by supplying address and control signals to mechanical film selection and positioning apparatus 38. The address signals set the card selecting plates in selector 80 and the control signals initiate rotation of drum 76 by motor 82.

It should be noted that card selection depends only on card edge coding and is not dependent on the location of card on drum 76. When the addressed card passes selecting apparatus 80, it is partially withdrawn from drum 76 so that it engages feeler switch 87. Upon closing, switch 87 provides a signal to micropreocessor 36 which causes the microprocessor to start counting pulses received from switch 88, which provides a pulse upon the passing of each toothe of gear 85. When the microprocessor 36 has counted a selected number of pulses, it provides an output signal to a motor control circuit to cause the rapid stopping of drum 76 with the selected card in the position 44C wherein it can become engaged by the engaging clip 94 on the end of positioning arm 92. Counting may also be achieved by the FIG. 5 circuit.

Microprocessor 36, after stopping drum 76 in the correct position provides a first set of control signals to positioning apparatus 38 to cause the arm 92 to withdraw card 44 and position the nominal location of reference frame 136 in the operative position 110 of the video detecting apparatus. The operative position consists of the raster location for zero error of the reference frame location.

When the card is in position for reference frame 136, microprocessor 36 provides control and nominal position signals to sweep generator 46 to cause the sweep generator to provide flying spot scanner 50 with nominal horizontal and vertical deflection signals. These signals are of a size to provide a raster pattern corresponding to the size of the entire frame, and are at the nominal position and angular orientation of the frame. Where the frame is positioned at 90° rotation, the microprocessor 36 can provide a control signal to cause the nominal raster pattern to be supplied with this rotation.

As the flying spot scanner scans the reference frame 136, a video signal is generated which includes signal portions corresponding to marker image 134 on reference frame 136. The marker image video signal is provided to the marker recognition logic, which generates marker position signals which are supplied to microprocessor 36. The microprocessor analyzes the marker image signals, and by reference to ideal marker position data determines the positional variation of marker image 134 from its nominal marker image location. If a raster rotation function is provided, the microprocessor 36 also detemines the angular deviation of the marker image from its nominal orientation. Once the position of the marker image 134 on reference frame 136 has been determined by microprocessor 36, the position is stored and a control signal is provided to cause mechanical positioning apparatus 38 to move the film card to a position wherein the frame containing the desired image is in the operative position of the video detecting apparatus.

When the desired frame is positioned, microprocessor 36 provides control and position signal to sweep generator 46 to cause the sweep generator to generate horizontal and vertical deflection signals with a position corresponding to the position of marker image 134 on reference frame 136, thus correcting the raster pattern for the position error of reference frame 136. If rotational capability is provided, the deflection signals are also compensated for the actual orientation of the reference frame marker position. The video signal generating apparatus provides an output video signal corresponding to both the marker image 134 on the selected frame and the information bearing images on the frame. This signal is provided to the marker recognition logic 65 which provides marker position signals to microprocessor 36. Again, the microprocessor analyzes the marker image data and determines the actual location of marker image 134 on the selected frame. Position control signals which center the raster pattern on the selected frame can then be generated.

The two-step process for positioning the raster pattern on the frame has the advantage of correcting major position errors between the image location and the mechanical dimensions of the film card by use of reference frame signals which have only a marker image, and correcting the relatively minor frame-to-frame errors using the marker image on the desired frame. This error is likely to be less than the card to frame image error and the marker image can be more easily located near its nominal position, even in the presence of information bearing image signals.

Having thus far located the actual image position on the selected frame, it is still necessary for the system to select and display only the image portion which is desired, such as an individual signature. Assuming the desired images comprise signatures positioned on a frame in locations 138 as shown in FIG. 8, the deflection apparatus must generate a smaller raster pattern centered on a frame guadrant corresponding to the desired signature. Thus, microprocessor 36 changes the sweep generator control signals to generate a smaller raster and changes the raster position signals to compensate for the detected frame position and rotation errors and to position the raster over the frame quadrant containing the desired image. The raster will then accurately sweep over a frame portion which contains three signature images. Only one of these images is desired.

The other two images can be removed from the video signal by microprocessor 36 providing a control signal to synchronizing and blanking circuit 62 to blank the signal protions corresponding to the undersired images.

As noted, the output video signal is corrected for black level, image density, and image polarity by the apparatus shown in FIG. 19. Where multiple displays are connected to a single film reading apparatus, the video switching circuits and memories shown in FIG. 2 are used under the control of microprocessor 36 to provide multiple simultaneous video signals to the displays.

While representative applications and embodiments of the invention have been described, those skilled in the art will recognize that many variations and modifications of such embodiments may be made without departing from the spirit of the invention and it is intended to claim all such variations and modifications as fall within the true scope of the invention.

I claim:

1. In a video processing apparatus, means, responsive to a supplied analog video signal for selectively reversing the polarity of said signal, comprising an amplifier having first and second output terminals providing video signals of opposite polarity, a first pair of oppositely facing diodes connected in series between said first amplifier output terminal and a video output terminal, and a second pair of oppositely facing diodes similarly oriented as said first diodes and connected in series between said second amplifier output terminal and said video output terminal, and means, responsive to a supplied polarity control signal, and connected to terminals between the diodes of said first and second diode pairs, for forward biasing the diode of one of said pairs and reverse biasing the diodes of the other of said pairs in response to a first condition of said polarity control signal, and for reversing the biasing of said diodes in response to a second condition of said polarity control signal.

2. In a system for selecting and displaying film stored information, wherein desired film images are selected from a plurality of stored film images and converted into video signals for use in generating images on video display units, apparatus for providing simultaneous display of multiple selected images on multiple displays, comprising at least one video memory, video switch means including at least one first video switch for selectively providing the supply of said video signals to said video memory or directly to said displays and second video switches for controlling the supply of said video signals from said memory to any one of said displays, and control means to cause a first image representative video signal to be recorded in said memory and thereafter supplied from said memory to a first display unit, said first unit being any selected one of said multiple displays, and to cause a second image representative video signal to be supplied to a second selected unit simultaneous with said supply of said first video signal to said first display unit.

* * * * *

UNITED STATES PATENT AND TRADEMARK OFFICE
CERTIFICATE OF CORRECTION

PATENT NO. : 4,271,430

Page 1 of 2

DATED : June 2, 1981

INVENTOR(S) : Gerald E. O'Brien

It is certified that error appears in the above-identified patent and that said Letters Patent are hereby corrected as shown below:

Sheet 6 of the Drawing should appear as shown on the attached sheet:

Col. 1, line 12, "micorfiche" should read --microfiche--;
Col. 1, line 27, "woudl" should read --would--;
Col. 1, line 38, "located" should read --locate--;
Col. 1, line 61, "sorted" should read --stored--;
Col. 5, line 4, "lies" should read --lines--;
Col. 5, line 9, "recognitin" should read --recognition--;
Col. 5, line 30, "referency" should read --reference--;
Col. 6, line 35, "conerter" should read --converter--;
Col. 6, line 43, "postion" should read --position--;
Col. 7, line 14, "microporcessor" should read --microprocessor--;
Col. 7, line 61, "conjuntion" should read --conjunction--;
Col. 8, line 17, "cards" should read --card--;
Col. 8, line 22, "with-drawn" should read --withdraws--;
Col. 10, line 8, delete "processor";
Col. 10, line 64, "raste" should read --raster--;
Col. 13, line 22, "accomodate" should read --accommodate--;
Col. 18, line 36, "toothe" should read --tooth--;
Col. 19, line 53, "guadrant" should read --quadrant--;

Signed and Sealed this

Twenty-second Day of September 1981

[SEAL]

Attest:

GERALD J. MOSSINGHOFF

Attesting Officer

Commissioner of Patents and Trademarks

UNITED STATES PATENT AND TRADEMARK OFFICE
CERTIFICATE OF CORRECTION

PATENT NO. : 4,271,430
DATED : June 2, 1981
INVENTOR(S) : Gerald E. O'Brien

It is certified that error appears in the above—identified patent and that said Letters Patent is hereby corrected as shown below:

Column 20, line 4, "protions" should read --- portions ---.

Signed and Sealed this

Third Day of November 1981

[SEAL]

Attest:

GERALD J. MOSSINGHOFF

*Attesting Officer*  *Commissioner of Patents and Trademarks*